US012475755B2

(12) United States Patent
Coder et al.

(10) Patent No.: US 12,475,755 B2
(45) Date of Patent: Nov. 18, 2025

(54) PRODUCT DISPENSING SYSTEM AND METHODS

(71) Applicant: Aunt Flow Corp., Columbus, OH (US)

(72) Inventors: Claire Coder, Columbus, OH (US); Anne Weigand, Columbus, OH (US); Pepin Gelardi, Brooklyn, NY (US); Emma Pearl Wilmer-Shiles, Brooklyn, NY (US); Gordon Thomas, Mason, OH (US); Mark Dalhart, Lebanon, OH (US); Jesse Klein, Brooklyn, NY (US)

(73) Assignee: Aunt Flow Corp., Columbus, OH (US)

( * ) Notice: Subject to any disclaimer, the term of this patent is extended or adjusted under 35 U.S.C. 154(b) by 0 days.

(21) Appl. No.: 18/657,639

(22) Filed: May 7, 2024

(65) Prior Publication Data

US 2024/0290162 A1 Aug. 29, 2024

Related U.S. Application Data

(63) Continuation of application No. 18/068,232, filed on Dec. 19, 2022, now abandoned, which is a continuation of application No. 16/988,607, filed on Aug. 8, 2020, now Pat. No. 11,532,197.

(60) Provisional application No. 62/884,787, filed on Aug. 9, 2019.

(51) Int. Cl.

*A47K 10/32* (2006.01)
*A47K 10/42* (2006.01)
*G07F 11/00* (2006.01)

(52) U.S. Cl.

CPC .......... *G07F 11/004* (2020.05); *A47K 10/424* (2013.01)

(58) Field of Classification Search

CPC .... G07F 11/004; G07F 11/005; A47K 10/424
See application file for complete search history.

(56) References Cited

U.S. PATENT DOCUMENTS 5,555,965 A * 9/1996 Mishina ................ A61F 15/003 221/6
D419,804 S 2/2000 Reitman
6,250,499 B1 6/2001 Gardner
(Continued)

FOREIGN PATENT DOCUMENTS

CA 2655678 1/2008
CA 2983228 A1 * 5/2018 ....... A61F 13/55185
(Continued)

OTHER PUBLICATIONS

"Cutlerease™ Touchless Utensil Dispenser." Uline.Com. Accessed May 31, 2024. https://www.uline.com/Product/Detail/H-10734/Utensils/Cutlerease-Touchless-Utensil-Dispenser.
(Continued)

*Primary Examiner* — Tuyen K Vo
(74) *Attorney, Agent, or Firm* — Summit Patents PC

(57) ABSTRACT

A dispensing unit for personal care products and personal protective equipment includes one or more dispensing assemblies contained within a single housing. The dispensing unit may contain dispensing assemblies that independently dispense two different types of products. Each dispensing assembly includes an actuator that mechanically injects a time delay between dispensings. Products are bundled together with support structures that are removed when the bundles are placed into a dispensing assembly.

28 Claims, 32 Drawing Sheets

(56) References Cited

U.S. PATENT DOCUMENTS

| | | | |
|---|---|---|---|
| 6,615,623 B1 | 9/2003 | Ormerod | |
| 9,501,888 B1 | 11/2016 | Morad et al. | |
| 9,554,678 B2 | 1/2017 | Wilson | |
| 9,721,419 B1 | 8/2017 | Morad et al. | |
| 9,779,574 B1 | 10/2017 | Morad et al. | |
| 10,062,236 B2 | 8/2018 | Morad et al. | |
| 10,192,286 B2 | 1/2019 | Furihata et al. | |
| 10,192,386 B2 * | 1/2019 | Morad | G07F 11/1657 |
| 10,424,146 B2 | 9/2019 | Morad et al. | |
| 2004/0140318 A1 | 7/2004 | Yu | |
| 2016/0307390 A1 | 10/2016 | Mason | |
| 2019/0105211 A1 | 4/2019 | Morad | |
| 2020/0060902 A1 | 2/2020 | Morad | |
| 2021/0145223 A1 | 5/2021 | Kim | |
| 2021/0267823 A1 * | 9/2021 | Loffredo | G07F 11/005 |
| 2022/0160555 A1 | 5/2022 | Morad | |

FOREIGN PATENT DOCUMENTS

| | | |
|---|---|---|
| CA | 3161796 A1 * | 12/2023 |
| CN | 113631066 | 11/2021 |
| GB | 2290776 | 1/1996 |
| WO | 2008042969 | 4/2008 |
| WO | 2017176918 | 10/2017 |

OTHER PUBLICATIONS

"Earthwise 15 11/16" ×8 5/8"×10 5/8" Wood Cutlery Dispenser 884465." WebstaurantStore, https://www.webstaurantstore.com/earthwise-15-11-16-x-8-5-8-x-10-5-8-wood-cutlery-dispenser-884465/788884465.html?utm_source=google&utm_medium=cpc&utm_campaign=GoogleShopping&gclid=CjwKCAjwx-CyBhAqEiwAeOcTdd7wqd3984kRID4zm0WrJh6Dq1G_IpPFC7FifJeAZRIf_bw_tUTUKBoCQp4QAvD_BwE Accessed May 31, 2024.

"Evogen San Nap Tamp Dual Dispenser Stainless Free." Hospeco Brands Group, Accessed May 31, 2024. https://hospecobrands.com/products/personal-care/menstrual-care/menstrual-care-dispensers/evogen-san-nap- tamp-dual-dispenser-stainless-free.

"Impact 25160100 Naturelle $.25 Sanitary Napkin/Tampon Dispenser and Convenience Pack." Webstaurantstore.com. https://www.webstaurantstore.com/impact-25160100-naturelle-25-sanitary-napkin-tampon-dispenser-and-convenience-pack/66525160100.html?utm_source=google&utm_medium=freeclicks&utm_campaign=GoogleShopping&srsltid=AfmB0orROEQPZJkRQnYPVoT4f8eyFuQGUbqEWNRi6COI-BYTX7vYbV7RMs8. Accessed May 31, 2024.

Uline.Com. Accessed May 31, 2024. https://www.uline.com/Product/Detail/H-8045/Personal-Hygiene-and-Dispensers/Feminine-Hygiene-Dispenser-Free-Vend.

Video, "EV1 Dispenser Instructions", Hospeco Brands Group. "EV1 Dispenser Instructions." YouTube video, 03:43. Apr. 13, 2022. https://www.youtube.com/watch?v=yKxTkaTIRy0 [accessed May 30, 2024].

* cited by examiner

PRODUCT DISPENSING SYSTEM AND METHODS

CROSS-REFERENCE TO RELATED APPLICATIONS

This application is a continuation of co-pending U.S. Continuation application Ser. No. 18/068,232, filed Dec. 19, 2022, which is a continuation of U.S. Non-Provisional application Ser. No. 16/988,607, filed Aug. 8, 2020, now U.S. Pat. No. 11,532,197, which claims priority to U.S. Provisional Application No. 62/884,787, filed Aug. 9, 2019, the disclosures of all of which are hereby incorporated by reference in their entireties as if fully recited herein.

TECHNICAL FIELD

Exemplary embodiments relate generally to systems, devices, and methods for dispensing products, and in particular to systems, devices, and methods for dispensing personal care products (PCP) and personal protective equipment (PPE), such as menstrual products, sanitizing wipes, face masks, and gloves.

BACKGROUND OF THE INVENTION

Personal care products may be used for personal hygiene (e.g., to care for bodily health and wellbeing through cleanliness). For example, menstrual products can be used for personal hygiene during menstruation or other bodily functions. Common personal care products include menstrual products such as tampons and pads. Often, the need for personal care products may come unexpectedly. For example, menstrual flow may start unexpectedly. A lack of readily available personal care products can negatively affect personal health and self-esteem, may cause soiling of clothing, and may disrupt daily activities. A person that does not have readily available personal care products when there is a need may have to leave school or work or abstain from sports or other activities. Conventionally, to obtain personal care products, an individual has to travel to a store or to their residence.

Conventional personal care product dispensing systems use products that are individually packaged with robust packaging to withstand forces during transportation, loading of the dispensing system, dispensing of the product, and the like. For example, each individual product, such as a tampon or pad, may be packaged in a box. Pads are conventionally put in boxes that are around 25 mm thick. The robust individual packaging of each product requires extra room within the dispensing system and increases costs of each product and of the dispensing system. This often results in the need for a larger dispensing unit that can hold a sufficient number of products containing the robust packaging. When used, the individual packaging around each personal care product, including any robust packaging, is typically discarded and must enter the waste stream.

The use of personal protective equipment (PPE) is a way to lower an individual's risk of illness caused by viruses and other pathogens. The risk individuals face when they do not have proper PPE is especially high during flu season, pandemics such as the COVID-19 pandemic, or any other communicable disease outbreak. Various types of PPE, including sanitizing wipes, face masks, and gloves can offer individuals increased protection against germs and illness, particularly when they are in proximity to other persons, such as at work, school, or shopping. However, if an individual does not adequately plan ahead, they may find themselves without PPE and at an increased health risk, particularly when engaging in an activity that puts them in close proximity to others. It is often inconvenient or impossible for an individual to get to the proper type of store to purchase PPE while they are at work, school, traveling, shopping or engaging in other activities.

Conventional product dispensing systems may be difficult to load, difficult to timely restock, and may result in waste of products and packaging. For example, placing individual items into a conventional dispensing system is often time consuming and may cause damage to the individual items. The need to touch each individual item during restocking in order to place it into the dispenser may also cause health and cleanliness concerns.

Determining when to restock a conventional dispensing system may also be difficult and time consuming. Conventionally, dispensing systems require that one open the dispenser in order to view how much inventory is left. Accordingly, the depletion or absence of stock may often go unnoticed. Stock can be depleted quickly if users are allowed to dispense multiple products from the dispensing system within a short time period. Accordingly, it is very common for conventional dispensers to remain empty for long periods of time because they do not hold a sufficient amount of product, they are time consuming to refill, pr it is otherwise not apparent when the dispenser is empty.

Conventionally, dispensing systems may become damaged from improper usage, such as the forcing of buttons and levers. Conventional dispensing systems are built robustly (e.g., made of metal and glass) to attempt to withstand improper usage. The increased cost to build and repair a conventional robust dispensing system is often transferred to the cost of the products. Even if a conventional dispensing system is available, users may not use the conventional dispensing system because of the overpriced products.

SUMMARY OF THE INVENTION

The devices, systems, and methods disclosed herein provide products via a dispensing system that may be a free vend system. Products include personal care products and personal protective equipment (PPE). Personal care products may include tampons, pads, and other menstrual products. PPE may include wipes such as sanitizing wipes, face masks, and gloves. The dispensing system may include a dispensing device and one or more assemblies of personal care products or PPE joined by a corresponding support structure. In some embodiments, an assembly or bundle of products may include a plurality of products held together by a strap or other type of securing element that may be placed in a dispensing system for dispensing of individual products, and the strap or other type of securing element removed by a user. In some embodiments the individual products are packaged.

The dispensing system may include a dispensing unit with one or more dispensing assemblies housed therein. Each dispensing assembly may include a dispensing body forming an interior volume. A dispensing assembly may further include a dispensing mechanism and an actuator (e.g., paddle, motion sensor, knob, etc.) coupled to the dispensing mechanism. The dispensing assembly may comprise one or more chutes that are configured to receive an assembly of products joined by a support structure within the interior volume. An assembly may be a bundle of products encircled by a strap, band, or other wrapping element that can hold multiple products together). Responsive to placement of the assembly in the chute and removal of at least a portion of the support structure (e.g., removal of a wrapping element), the plurality of products falls downward into the chute, and a first product of the assembly of products may contact the dispensing mechanism. Responsive to actuation of the actuator that is coupled to the dispensing mechanism, such as a user applying pressure to a paddle button, the first product may be dispensed from the dispensing assembly and a second product may subsequently come into contact with the dispensing mechanism. The dispensing device may continue dispensing products until all of the products contained within the assembly have been dispensed. Once the products contained within the dispensing assembly are depleted, or while they are being depleted, a further bundle or assembly of products may be inserted in the dispensing assembly. Multiple bundles or assemblies of products may be loaded into a dispensing assembly at a time.

One or more dispensing assemblies in a dispensing unit may have a dispensing mechanism that performs delayed dispensing. After an item is dispensed, a time delay mechanism prevents the assembly from dispensing another item right away. This time delay prevents over-dispensing of the product.

The dispensing system may dispense one or more types of products, and may provide for either single chamber dispensing or dual chamber dispensing. In some embodiments, the dispensing system receives one or more assemblies of a first type of product and one or more assemblies of a second type of product. For example, a dispensing system that is configured to dispense both packaged pads and tampons may receive a first assembly that includes a first stack of pads secured by a wrapping element, a second assembly that includes a second stack of pads secured by a wrapping element, a third assembly that includes a set of tampons secured by a wrapping element, and a fourth assembly that includes a second set of tampons secured by a wrapping element. One or more windows in the dispensing system may provide a view of how much of the one or more types of personal care products are remaining to improve timely restocking.

In another exemplary embodiment the dispensing system may dispense one or two different types of PPE, such as face masks, sanitizing wipes, or gloves. In yet a further exemplary embodiment the dispensing system may dispense one or more types of PPE and one or more types of personal care products.

In some embodiments an assembly may contain a single dispensing unit for dispensing a single type of product or a single type of product packaging. In other embodiments two or more dispensing assemblies may be housed together to allow for two different types of products to be dispensed from one overall assembly. For example, two dispensing units configured to dispense packaged pads may be housed in one overall assembly.

The devices, systems, and methods disclosed herein have advantages over conventional solutions. The product dispensing system may dispense products that do not have individual robust packaging, thus saving room in the dispensing device, saving packaging materials, and saving costs of the products and the dispensing device to make products more available, including under free-vend applications. Product packaging may protect the products during transport, during filling of the dispensing device, provide ease of stocking of the dispensing device, and the like without having robust individual packaging for each product, thus saving materials, saving time, reducing damage of the products, and saving product costs. In an exemplary embodiment, products are packaged in envelopes that can be dispensed by a dispensing device. The envelopes may have a generally rectangular shape with a top flap that can be opened by a user to access the product inside. The envelopes are flexible and generally take up less space than conventional box packaging. Assemblies containing multiple products packaged in envelopes held together with a strap or other securing element may be used to stock a dispensing device. A variety of products may be packaged in envelopes for vending, including personal care products such as pads, and PPE such as wipes, face masks, and gloves. A variety of items may be folded or otherwise presented within an envelope or other type of packaging for dispensing. Envelope structures may be flexible, and compress when stacked in a chute or otherwise subject to pressure. Envelope structures may take up to one third of the vertical space as conventionally packaged pads, allowing exemplary devices to store more product. In other exemplary embodiments personal care products such as tampons may be packaged in paper or plastic.

Dispenser systems may include dispensing mechanism with mechanical time delay features that prevent excessive dispensing of items within a short amount of time. The time delay features may impose a multi-second delay between dispensing events. In an exemplary embodiment the time delay is between 3 and 12 seconds.

Exemplary dispensing mechanisms may prevent damage to the product, damage to the dispensing device, and over-dispensing of the product and may allow the products to be provided at a low cost or no cost to users. The time-delay feature of the actuator may prevent unneeded diversion of products from the dispensing device and ensure that more users are able to have access to personal care products and/or PPE when they need it. By providing a view of current inventory via one or more windows, the dispensing system makes loading easier, makes timely restocking easier, and results in less waste of products and packaging than conventional systems. The product dispensing system may make personal care products and PPE more available to users in a variety of environments and positively affect personal health, including reducing transmission of germs and illness, avoid disruption of daily activities, avoid soiling of clothing, and the like.

An exemplary method for stocking a product dispenser comprise the steps of obtaining an assembly of products held together by a support structure, accessing a dispensing assembly associated with a product dispenser where the dispensing assembly has a receptacle for receiving at least one such assembly, placing the assembly of products into the receptacle of the dispensing assembly, removing the support structure from the assembly of products, and removing the support structure from the dispensing assembly. The method may also include the step of encircling the plurality of products with a strap or other type of support structure. The strap may comprise a rectangular piece of paper having a first end and a second end that are held together with an adhesive, a crimp, a seam, glue, or other means. The strap may be strong enough to hold the assembly together, but capable of being easily torn and removed from the assembly by a user. Depending on the embodiment, the assembly may be formed from personal care products such as tampons or pads, or it may be formed from PPE items such as face masks, sanitizing wipes, or gloves. In some embodiments the assemblies may be inserted into a chute or other receptacle associated with a dispensing assembly that is meant to hold product prior to dispensing. A chute may have two partial front walls defining a front access region. When a bundle or assembly of items is placed into the chute the user may access the support structure through the front access region and/or remove the support structure from the assembly or bundle through the front access region.

An exemplary embodiment comprises a packaged product for use with a dispensing assembly. The packaged product may include a personal care product or an item of PPE that is contained within an envelope structure. In an exemplary embodiment the envelope is formed by folding a bottom panel and side flaps over a face panel along fold lines. When formed the envelope has a cavity that can hold an item. A top flap may be folded over and adhered or otherwise attached to the bottom panel or the body of the envelope in order to keep the item inside the envelope. Pressure sensitive adhesive, glue, stickers, or other means may be used to secure the top flap. A user may open the top flap to access the item. In an exemplary embodiment an envelope structure is made from paper, heavy paper, or cardboard. In an exemplary embodiment a personal care product such as a pad is provided in an envelope structure that can be dispensed.

Exemplary devices include a dispensing mechanism that includes a paddle arm, a dog, and a drive gear in connection with a roller mechanism. The drive gear is configured to fit within a slot in a chassis, and associated with a drive gear spring that exerts an outward force on the drive gear. When the paddle arm is actuated it causes the dog to contact the drive gear and move the drive gear in a first direction within the slot. This continues until the dog, which pivots about a pivot point, slides underneath a lower portion of the drive gear. The drive gear then moves within the slot in a second direction, under the force of the drive gear spring to return to its original position. The paddle arm returns to its resting position in delayed motion caused by a damper gear engaged with the paddle arm. Accordingly, although a product may be dispensed quickly, the mechanism does not allow for further actuation until the paddle arm has returned to its original resting position. In exemplary embodiments it may be 3-12 seconds for the time delay to occur.

It may be noted that dispensing systems disclosed herein are used for purposes of illustration, rather than limitation. In some embodiments, the dispensing system is used to dispense one or more types of personal care products or PPE. In other embodiments, the dispensing system is used to dispense one or more types of objects that may be of a similar size or shape as personal care products, or be contained within similar packaging, such as contraceptive products (e.g., condoms), toiletries, or the like.

BRIEF DESCRIPTION OF THE DRAWINGS

Novel features and advantages of the present invention, in addition to those mentioned above, will become apparent to those skilled in the art from a reading of the following detailed description in conjunction with the accompanying drawings. It should be noted that different references to "an" or "one" embodiment in this disclosure are not necessarily to the same embodiment, and such references mean "at least one" embodiment.

FIGS. 13A and 138 are cross-sectional views illustrating a roller during actuation;

DETAILED DESCRIPTION OF THE INVENTION

Embodiments described herein are related to a product dispensing system that

Referring to FIGS. 1-6, an exemplary embodiment of a product dispensing system 100 comprising a dispensing unit

Figure 1:
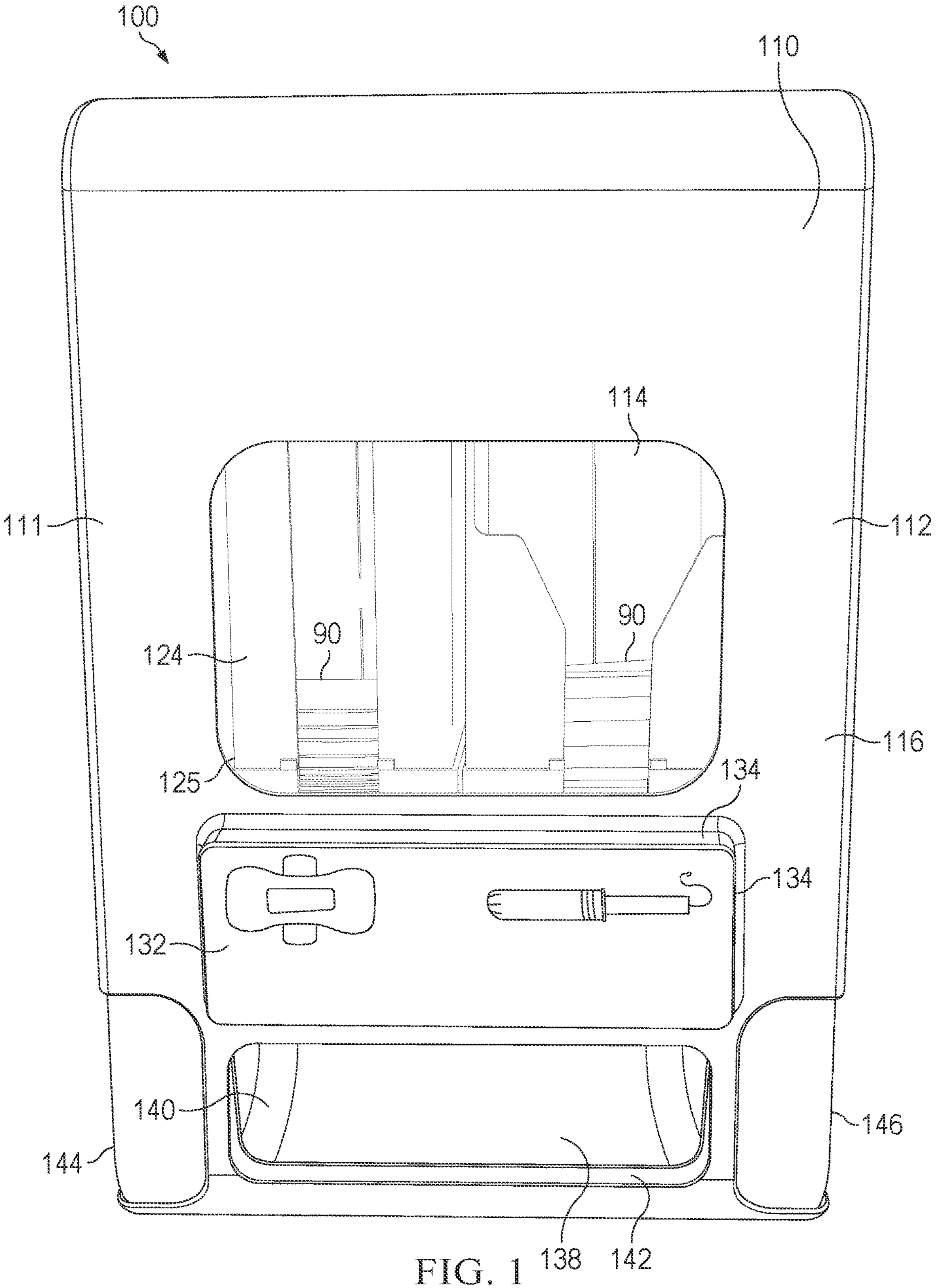
FIG. 1 is a front perspective view of a product dispensing system according to an exemplary embodiment.
Figure 2:
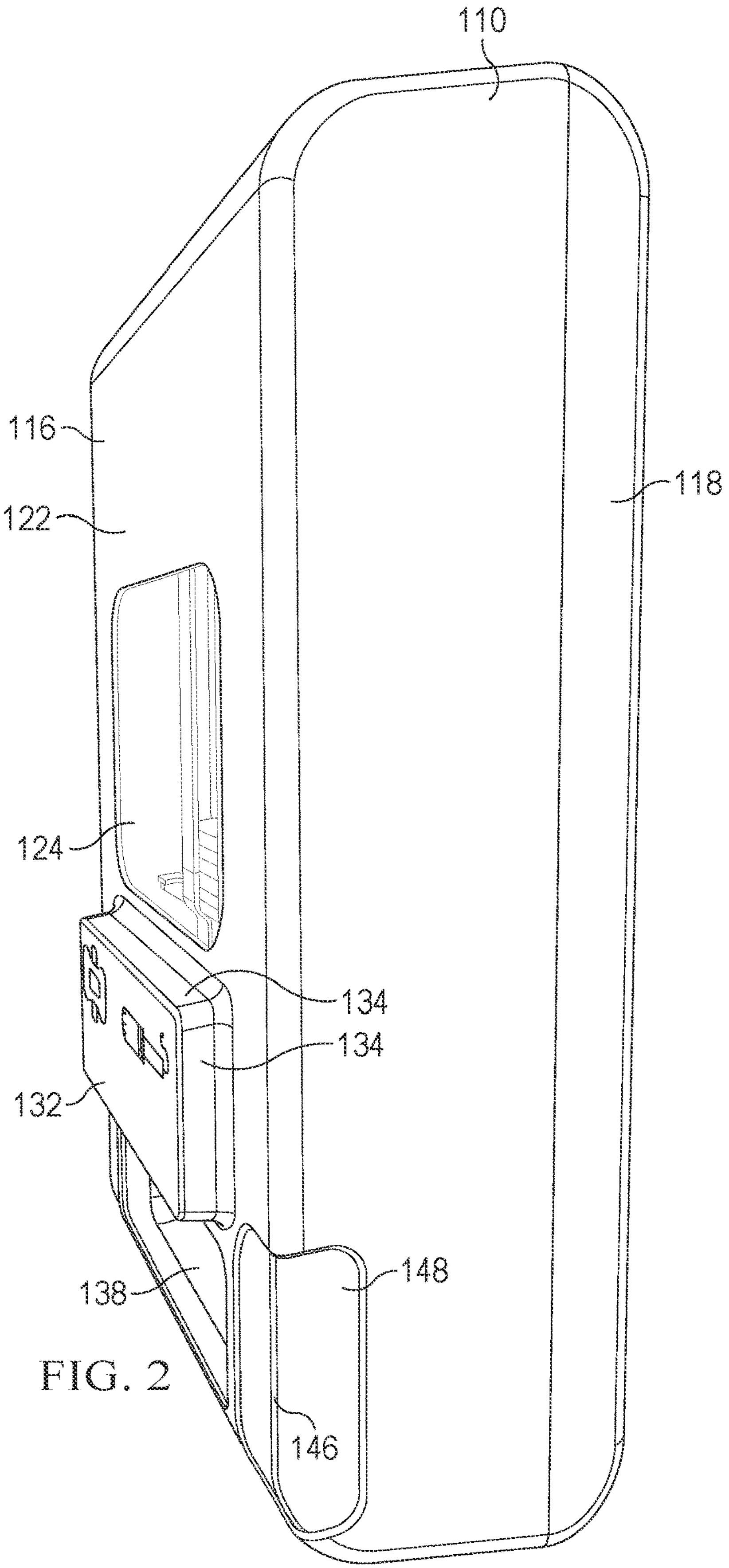
FIG. 2 is a right-side perspective view of the product dispensing system of FIG. 1.
Figure 3:
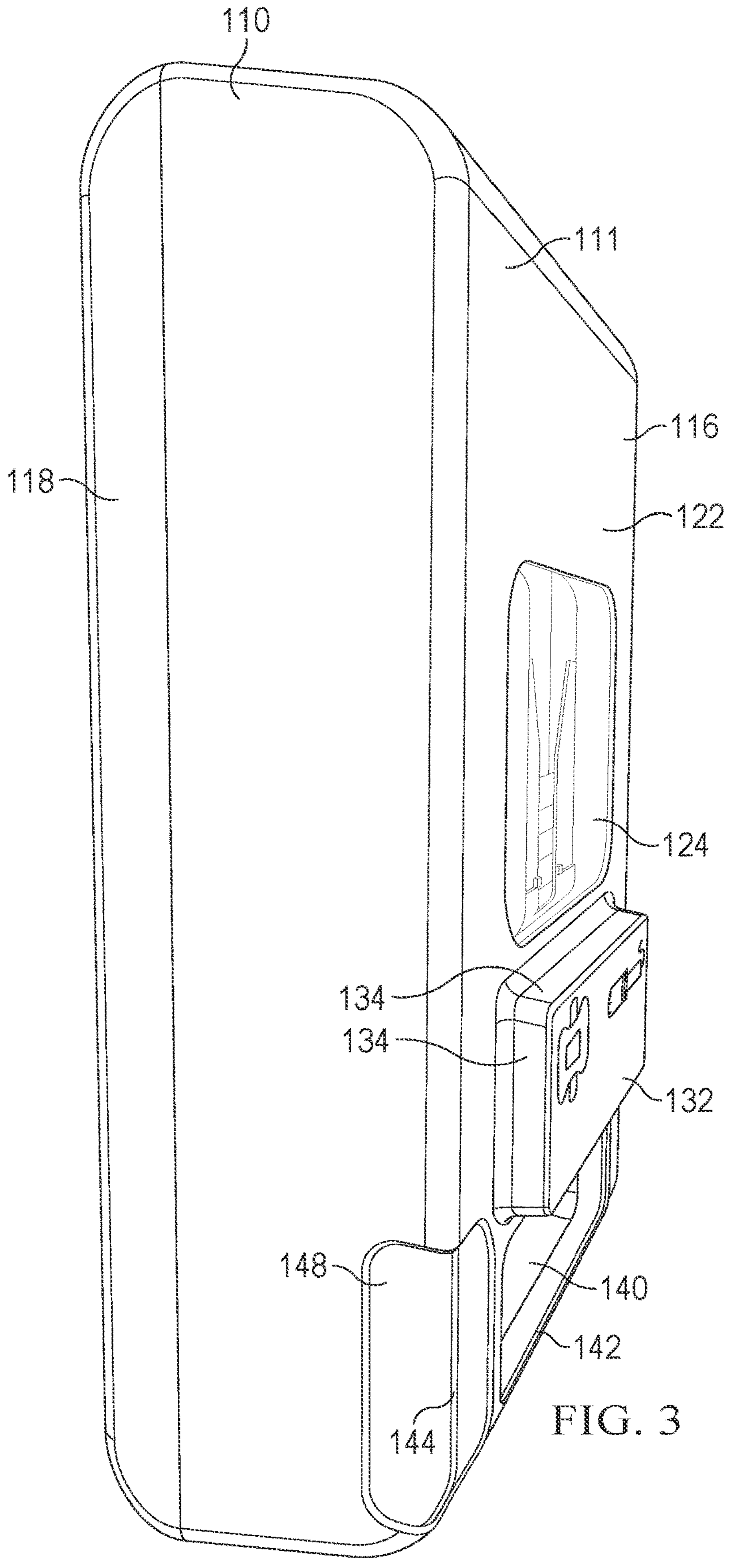
FIG. 3 is a left-side perspective view of the product dispensing system of FIG. 1.
Figure 4:
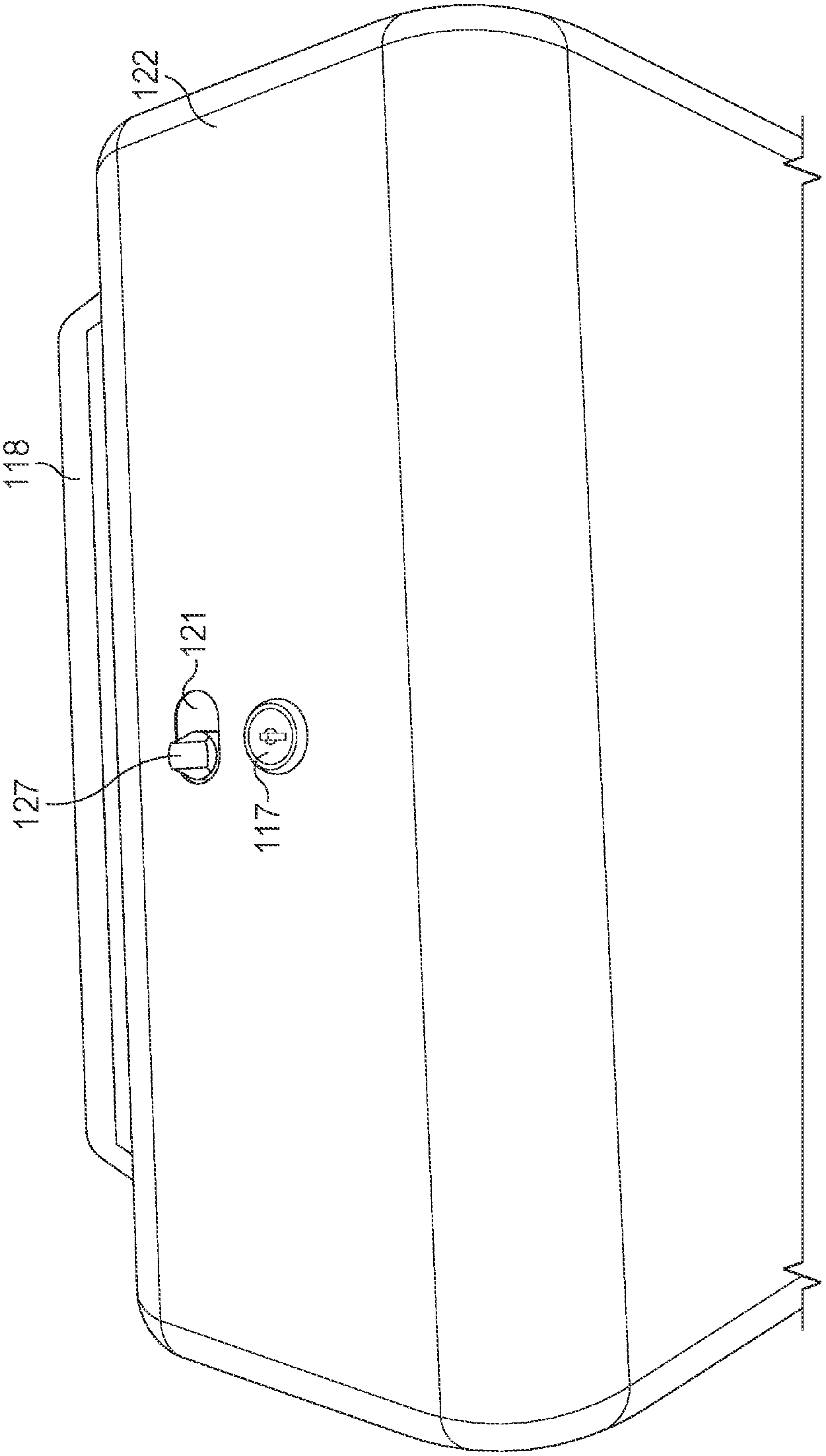
FIG. 4 is a top perspective view of the product dispensing system of FIG. 1.
Figure 5:
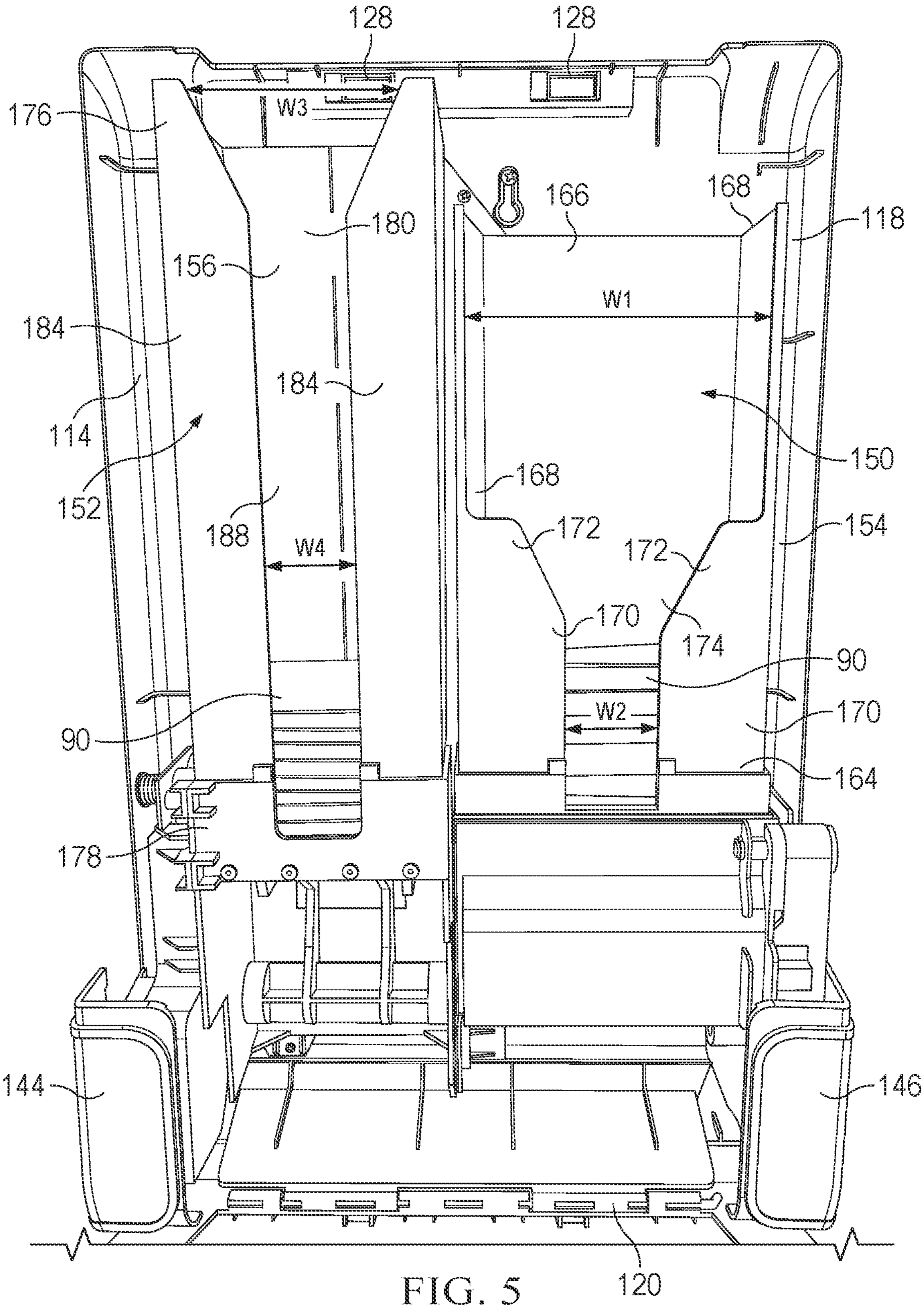
FIG. 5 is a front perspective view of the product dispensing system of FIG. 1 with front cover opened.
Figure 6:
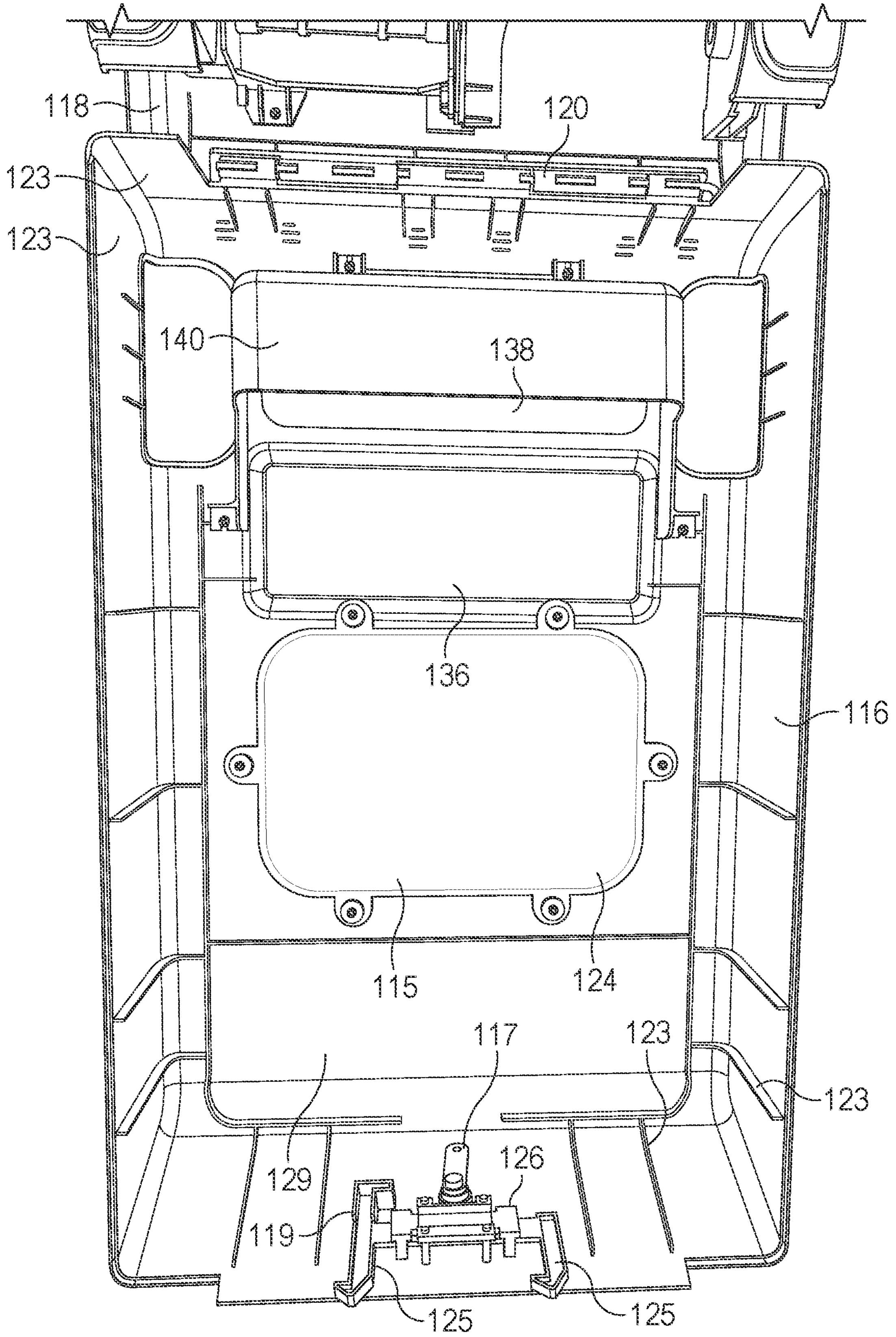
FIG. 6 is a front perspective view of the product dispensing system of FIG. 1 with the front cover opened.

110 is illustrated. The dispensing unit 110 includes an outer housing 112 that defines an interior volume 114. The outer housing 112 includes a removable front cover 116 and a rear case 118 that interlock when the front cover 116 is in a closed position. FIGS. 1-4 illustrate the outer housing 112 of the dispensing unit 110 in a closed position. Referring to FIGS. 5 and 6, a hinge assembly 120 located on the outer housing 112 may allow the front cover 116 to hang downwards when the front cover 116 is in a fully open position, allowing the interior volume 114 of the dispensing unit 110 to be accessed for restocking or other purposes. In other embodiments the front cover 116 may connect to the rear case 118 or other structure of the dispensing unit 110 in a variety of ways and locations, including a hinge located on the side of the dispensing unit. In certain exemplary embodiments the front cover 116 may completely detach from the rest of the dispensing unit 110.

In the exemplary embodiment, the front cover 116 has a generally planar front surface 111 and four side walls 123. The front cover 116 may include an aperture 115 through which a window 124 is mounted for providing at least a partial view of the interior volume 114. A user may utilize the window 124 to see how much of one or more types of products 90 are remaining to improve timely restocking. The window 124 may also allow a user to determine whether the dispensing unit 110 is functioning properly. The window 124 may be formed of fully or partially transparent plastic or glass, and may be in a central location on the front cover 116. In other embodiments there may be multiple windows or there may be no windows. In other exemplary embodiments the entire front cover 116 or housing 112 may be transparent. The front cover 116 may comprise a unitary molded piece or be constructed from one or more pieces of plastic or other materials.

A latch assembly 119 located on the inside surface 129 of the top side wall of the front cover 116 may hold the front cover 116 to the rear case 118 in a fully closed position. The latch assembly 119 may comprise a pair of generally hooked shaped members 125 attached to a common shaft 126 upon which is disposed a knob 127. The relative orientation of the hooked shaped member 125 may correspond with a pair of latch pockets 128 located on the top of the rear case 118, such that when said front cover 116 is fully closed the hooked shaped members 125 may at least partially engage with the latch pockets 128 and the knob 127 is accessible through an aperture 121 on the top side wall 123. In order to open the front cover 116, a user may manipulate the knob 127 in a translateral fashion to disengage the hooked shaped members 125 from the latch pockets 128. To close the front cover 116, a user may align the front cover 116 and rear case 118 so that the hooked shaped member 125 and latch pockets 128 align, allowing a spring associated with the hooked shaped members 125 to reengage the hooked shaped members with the latch pockets.

A locking mechanism 117 located on the top side wall 123 of the front cover 116 allows the front cover 116 to be securely coupled to the rear case 118 when the front cover 116 is in a fully closed position. The locking mechanism 117, when in a locked state, may prohibit the knob 127 from being moved or otherwise prohibit the latch assembly 119 from being disengaged. This may prevent unwanted tampering with the internal components of the dispensing unit 110, as well as unwanted removal of products 90 from the dispensing unit 110. In some embodiments, the dispensing unit 110 may be locked and unlocked using different types of keys, including common administrator keys that can be used to open a plurality of different dispenser units. In some embodiments, the dispensing unit 110 may be opened by a unique key, including but not limited to a mechanical key such as a shape driven key, an electronic key such as a radio-frequency identification (RFID), optical keys, or the like).

A raised platform 132 having a peripheral wall 134 forming a generally rectangular shape extends out from the outside surface 122 of the front cover 116 below the window 124. The platform 132 and peripheral wall 134 define a corresponding recess 136 on the inside surface 129 of the front cover 116. A dispensing area 138 is located in the front cover 116 beneath the raised platform 132.

The dispensing area 138 includes an interior dispensing surface 140 for holding a dispensed product 90 and includes a lateral lip 142 that prevents a dispensed product 90 from falling out of the dispensing unit 110. On either side of the lower portion of the front cover 116 are located paddle buttons 144, 146 for actuating the dispensing unit 110 into dispensing a product. Side apertures 148 in the front cover 116 may receive paddle buttons 144, 146 and permit the paddle buttons 144, 146 to be relatively flush with the outside surface 122 of the front cover 116 when the front cover 116 is in a fully closed position and the paddle buttons 144, 146 are in an unactuated, resting state. In other exemplary embodiments it may be desirable for the paddle buttons 144, 146 to be inset a pre-determined distance from the outside surface 122 of the front cover 116 when in a resting state. In other exemplary embodiments various forms of actuators may be used instead of paddle buttons, such as push buttons, knobs, paddles, levers, and motion detectors.

Referring to FIG. 5, the interior of the dispensing unit 110 includes two dispensing assemblies 150, 152 for dispensing two different types of products. The dispensing assemblies 150, 152 may be in a side by side configuration but operate independently from one another. In the embodiment of FIG. 5, a first dispensing assembly 150 may be configured to dispense tampons while a second dispensing assembly 152 is configured to dispensing pads. Each dispensing assembly 150, 152 comprises a vertical feed chute 154, 156 for holding product 90 and feeding it into a lower dispensing mechanism 158, 160. The chute 154 for the tampon dispensing assembly 150 has a top end 162, a bottom end 164, and a rectangular cross-section. The chute 154 is further comprised of a back wall 166 and two side walls 168 that extend from the top end 162 to the bottom end 164 of the chute 154. Two partial front walls 170, each connected to a side wall 168, extend from the bottom end 164 of the chute 154 to a middle point of the chute 154. The top end 172 of each front wall 170 is angled, such that the width of the front walls 170 is narrower at their top end 162 than at the bottom end 164 of the chute. The partial front walls 170 and side walls 168 define a front access region 174 that traverses the entire width W1 of the chute above the partial front walls 170, and narrows according to an angle starting at the top end 172 of the front walls 170, and then remains at a constant width W2 at the bottom end of the chute 164. The shape of the front access region 174 may allow for easier loading and unloading of products into the chute 154, as well as allowing the amount of product to be viewable through the window 124.

The chute 156 for the pad dispensing assembly 152 has a top end 176, a bottom end 178, and a rectangular cross-section. The chute 156 is further comprised of a back wall 180 and two side walls 182 that extend from the top end 176 to the bottom end 178 of the chute 156. Two partial front walls 184, each connected to a side wall 182, extend from the bottom end 178 of the chute 156 to the top end 176. The top end 176 of each front wall 184 is angled, such that the width of the front walls 184 is narrower along an upper portion of the chute 156 than for the remaining portion of the chute 156. The partial front walls 184 define a front access region 188 that has a broadest width W3 at the top of the chute 156 narrows according to an angle along an upper portion of the chute 156, and remains at a constant width W4 for the remaining length of the chute 156. The shape of the front access region 188 allows for easier loading and unloading of products 90 into the chute 156, as well as allowing the amount of product to be viewable through the window 124. The chutes 154, 156 may be sized appropriately to contain the desired amount of product, as well as the shape and dimensions of the product. Different dimensions may allow the respective chutes to accommodate a similar number of products that are dissimilar in size and shape. For example, a chute intended to hold pads may be comparatively taller than a chute to hold tampons because the pads may be loaded into the chute in a single stacked formation whereas tampons or other types of personal care products may not be loaded in a single stacked formation but may instead be allowed to randomly settle into place inside the chute. The chutes could be made taller or shorter to accommodate larger or smaller amounts of products. One of ordinary skill in the art will recognize that in various embodiments the chutes could have a variety of different dimensions and overall designs, and the front access regions could also be altered in various ways as desired without departing from the scope of the invention. One of ordinary skill in the art will also recognize that the number of chutes and relative positions of the chutes could vary depending on how many dispensing assemblies are within a dispensing unit and which types of products are desired to be dispensed from one or more dispensing areas on the dispensing unit.

Figure 7:
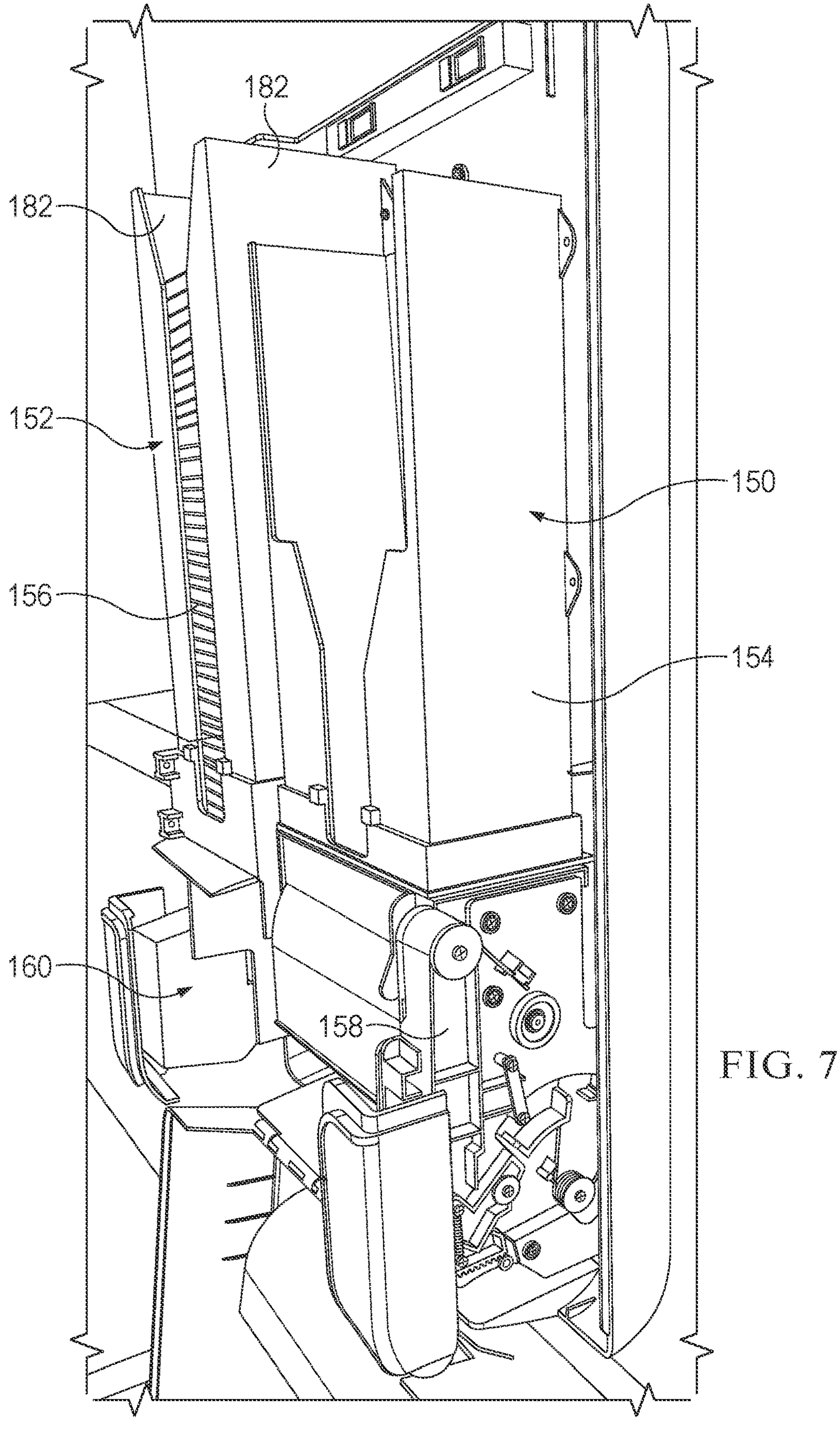
FIG. 7 is a right-side perspective view of the product dispensing system of FIG. 1 with front cover opened.

Referring to FIG. 7, the system may comprise two or more dispensing assemblies 150, 152. In exemplary embodiments, each dispensing assembly 150, 152 may be configured to dispense a different type of personal care product 90 such that said system 100 is configured to dispense at least two different types of personal care products 90. Each dispensing assembly 150, 152 may comprise a vertical chute 154, 156 and a dispensing mechanism 158, 160.

The dispensing mechanisms 158, 160 may be located at a distal end of the respective vertical chute 154, 156 such that said personal care products 90 provided at the vertical chutes 154, 156 are gravity fed into the dispensing mechanisms 158, 160. The vertical chutes 154, 156, in exemplary embodiments, may be configured to accommodate a particular type of personal care product 90. The vertical chutes 154, 156 may extend primarily in a vertical direction, though portions of the vertical chutes 154, 156 may extend in other directions.

Figure 8A:
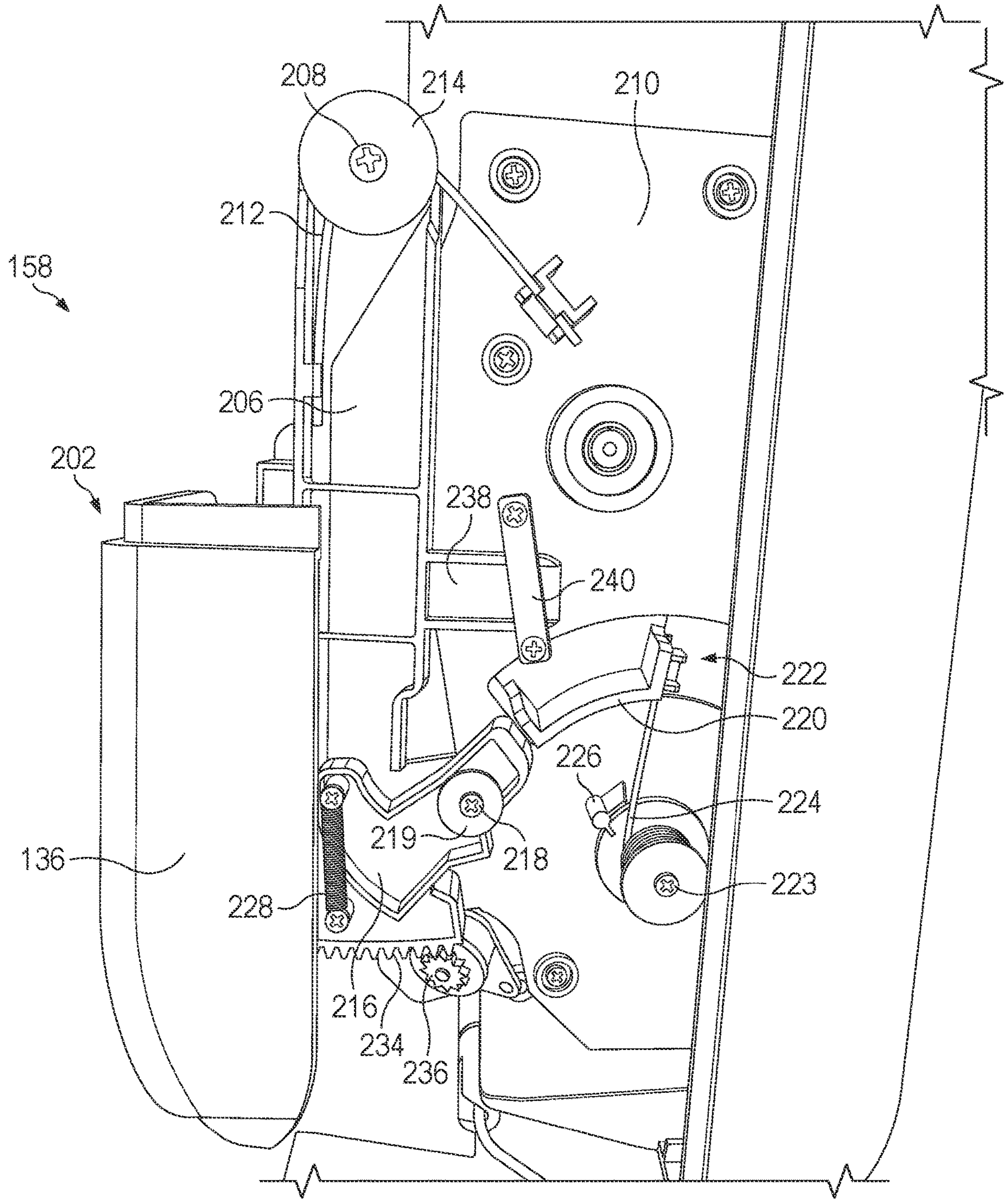
FIGS. 8A-8D illustrate a first dispensing mechanism of an exemplary embodiment in various stages of actuation.
Figure 8B:
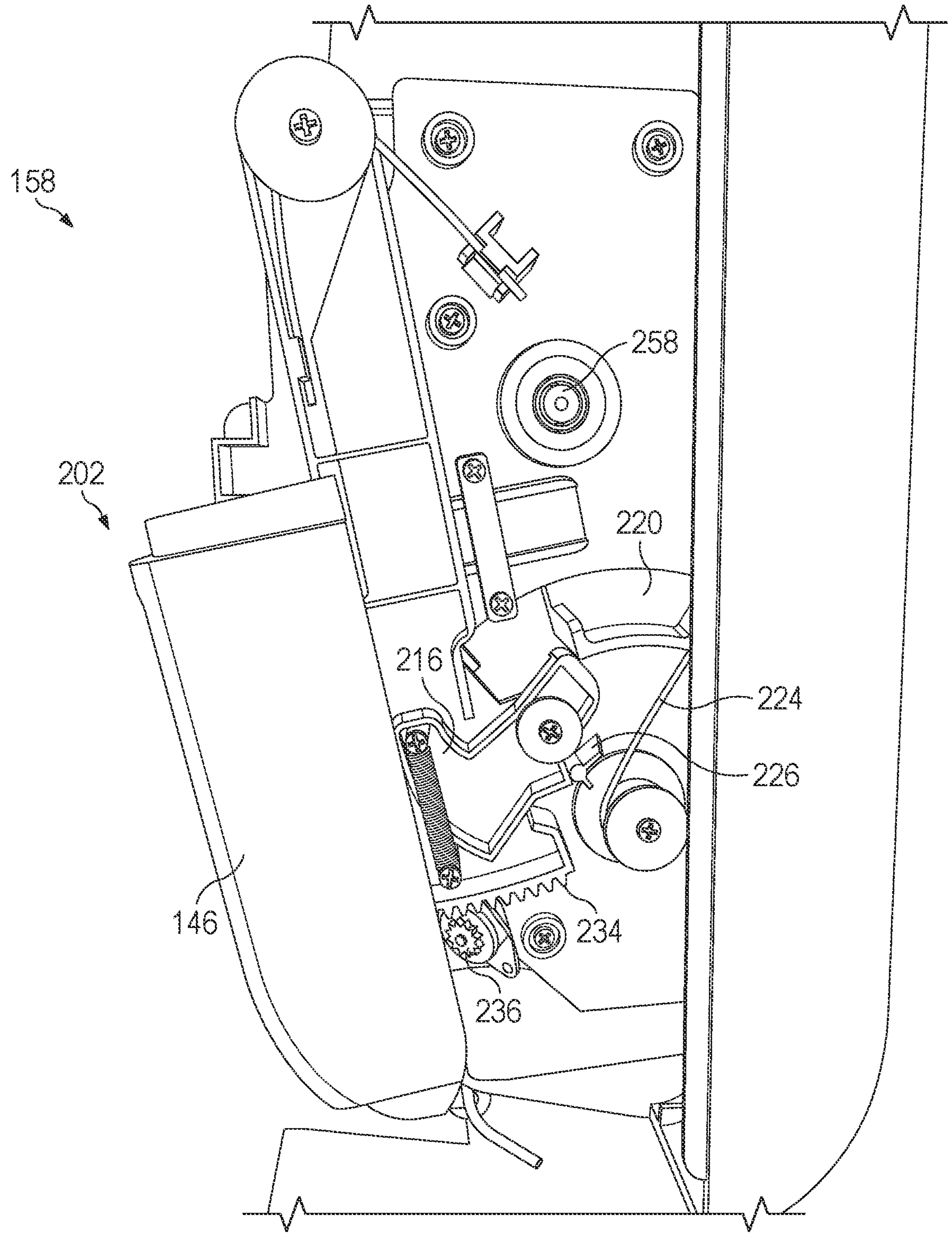
Figure 8C:
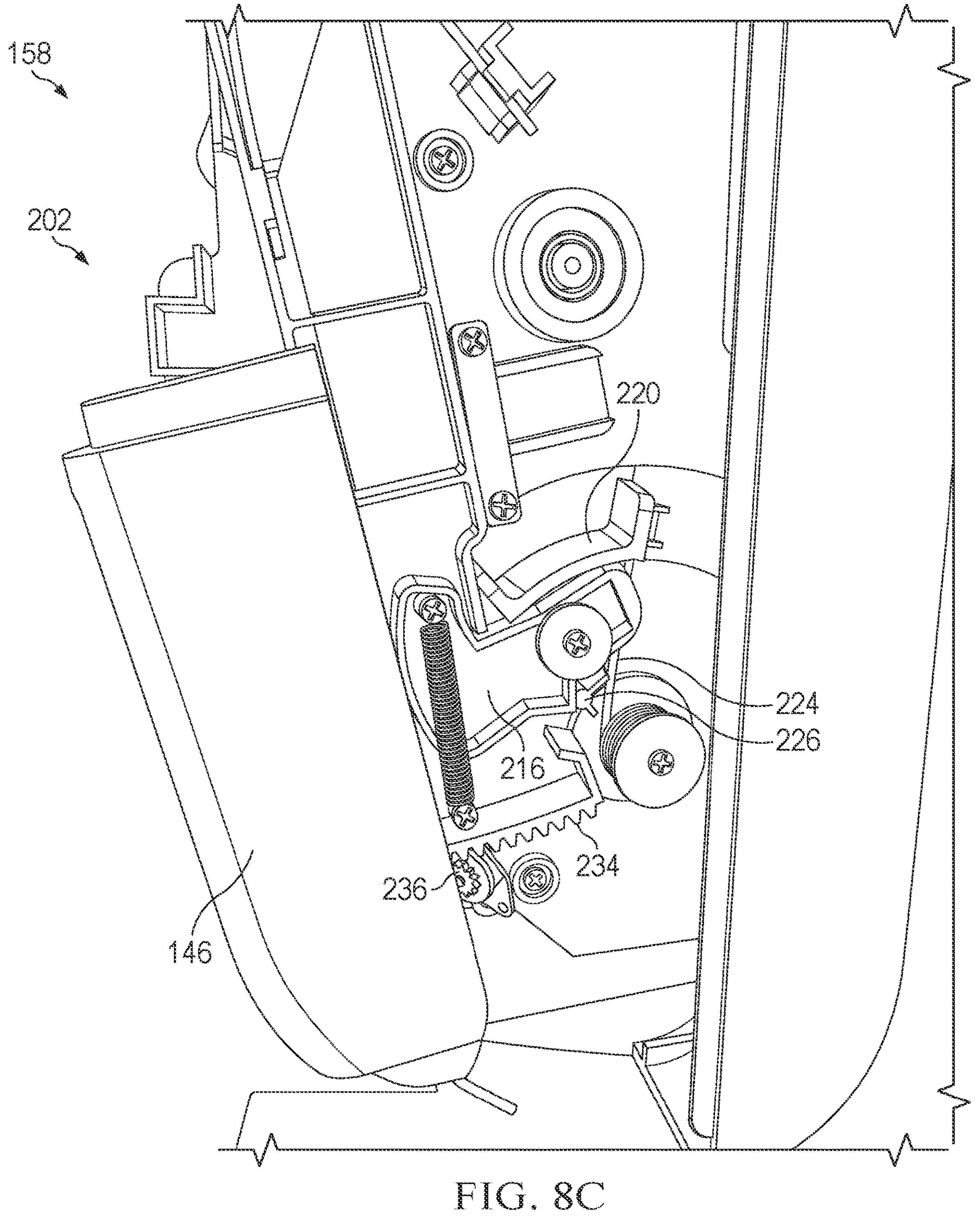
Figure 8D:
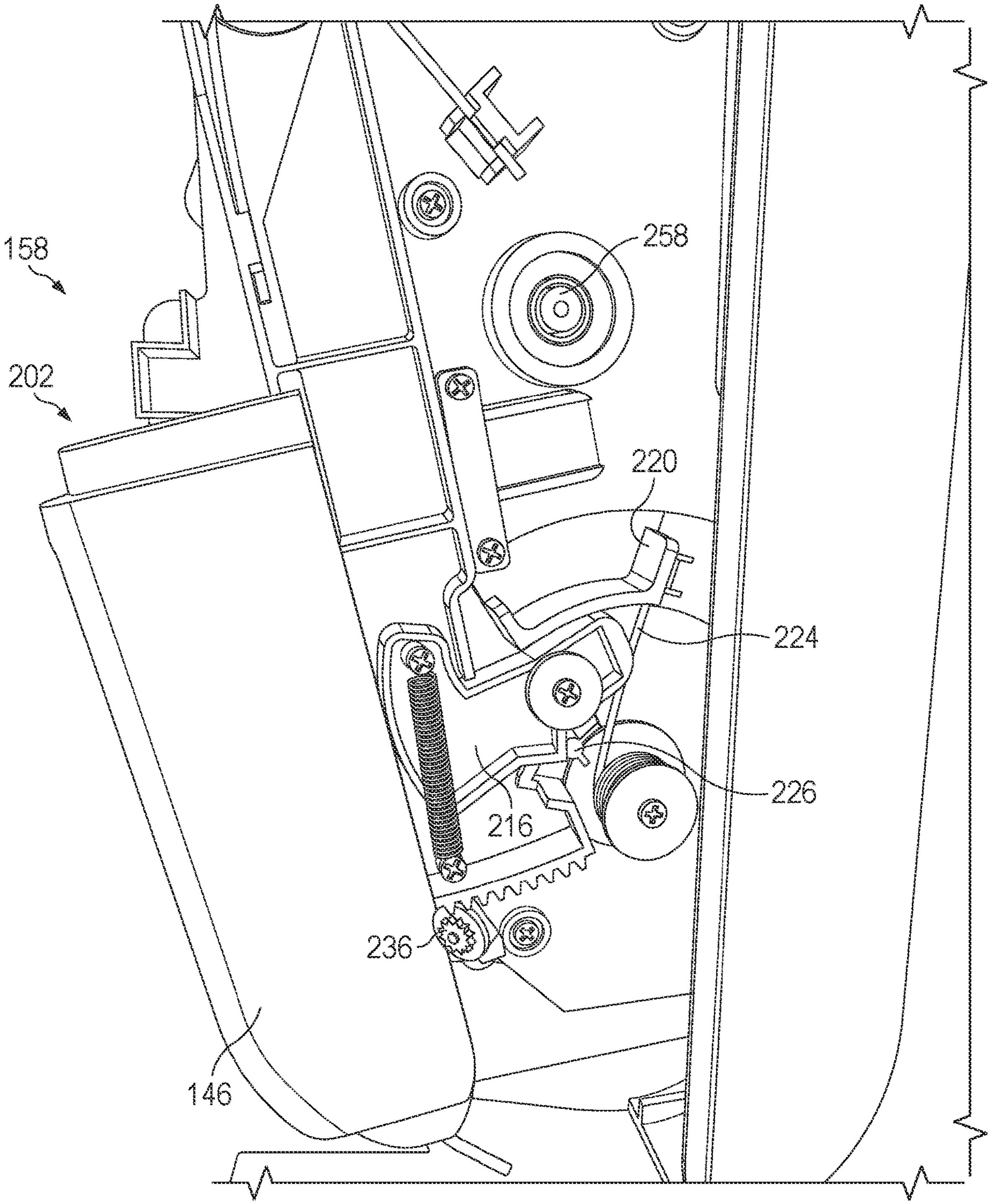

FIG. 8A illustrates a side view of the system 100 with a first item dispensing mechanism 158 in a resting position where no, or insufficient, user force is applied. FIG. 88 illustrates said first item dispensing mechanism 158 in an advanced position where a paddle arm 202 is advanced by user force. FIGURE SC illustrates said first item dispensing mechanism 158 in a reset position where a drive gear 220 is reset, which may occur despite continued application of user force. FIG. 8D illustrates said first item dispensing mechanism 158 in an intermediary position between said advanced and resting positions.

The first item dispensing mechanism 158 may be configured to translate user actuation of a contact section, such as pressure applied to a paddle button 146, into release of a single one of the first items 92. The first item dispensing mechanism 158 may be configured to automatically provide a time delayed reset of at least some components of said first item dispensing mechanism 158 after user actuation. In this way, a second one of said first items 92 may only be released after a period of time. In exemplary embodiments, only the paddle button 146 is time delayed while other components of the first item dispensing mechanism 158 reset. In an exemplary embodiment the time delay between dispensing of items may be 3 to 12 seconds. The first item dispensing mechanism 158 may comprise a paddle arm 202. The paddle arm 202 may comprise a connector 206. The paddle arm 202 may further comprise a contact section 146, which may be located at a distal end of the connector 206. The contact section 146 may be configured to be pushed or otherwise contacted by a user to activate the dispensing mechanism 158. The contact section 146 may comprise a paddle button, though any shape contact section 146 may be utilized.

The paddle arm 202 may be pivotally connected to a paddle arm pivot 208. In exemplary embodiments, the paddle arm pivot 208 may comprise a cylindrical or other shaped shaft extending from a chassis 210. The chassis 210 may comprise a substantially planar member, though various sizes and shapes may be utilized. A portion of the paddle arm 202, such as but not limited to the connector 206, may surround some or all of said paddle arm pivot 208 such that said connector 206 hangs from, and is configured for movement about, said paddle arm pivot 208.

The dispensing mechanism 158 may comprise a paddle arm spring 212. The paddle arm spring 212 may be configured to exert an outward pushing force on the paddle arm 202. For example, without limitation, the paddle arm spring 212 may be configured to exert forces on said paddle arm 202 which would normally cause said paddle arm 202 to rotate clockwise about said paddle arm pivot 208 towards a user. The paddle arm spring 212 may comprise a torsion spring which surrounds some or all of the paddle arm pivot 208.

A first portion of the paddle arm spring 212 may be connected to said chassis 210. For example, without limitation, a stop, block, aperture, receiver, or the like may be located at the chassis 210 which may be configured to receive or otherwise secure the first portion of the paddle arm spring 212. A second portion of the paddle arm spring 212 may contact or otherwise be secured to said paddle arm 202. For example, without limitation, the second portion of the paddle arm spring 212 may be received within a portion of, or otherwise blocked by, said connector 206. In exemplary embodiments, without limitation, a stop, block, aperture, receiver, or the like may be located at the connector 206 configured to receive or otherwise secure the second portion of the paddle arm spring 212.

A paddle arm cap 214 may be provided at the paddle arm pivot 208 and may be configured to secure said paddle arm spring 212. For example, without limitation, the paddle arm cap 214 may comprise a disk-shaped member located at a distal end of the cylindrically shaped paddle arm pivot 208 to secure the torsion-based paddle arm spring 212.

Figure 9:
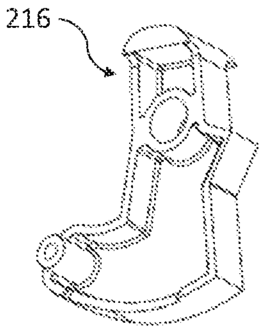
FIG. 9 is a front perspective view of the dog of the dispensing mechanism of FIGS. SA-8D.

A dog 216 may be connected to said paddle arm 202. Referring to FIG. 9, an exemplary embodiment of a dog 216 is shown. In other exemplary embodiments the dog 216 may have different shapes. For example, without limitation, the dog 216 may be connected to the connector 206 at a location behind said contact section 146. The dog 216 may be pivotally connected to said paddle arm 202, such as by way of a dog pivot 218. In exemplary embodiments, the dog pivot 218 may comprise a cylindrically shaped member extending from said paddle arm 202 and a portion of the dog 216 may be configured to accept the dog pivot 218. A dog cap 219 may be provided at said dog pivot 218. For example, without limitation, the dog cap 219 may comprise a disk-shaped member located at a distal end of the cylindrically shaped dog pivot 218 to secure the dog 216.

The dog 216 may be positioned on the paddle arm 202 to contact a drive gear 220 during at least a portion of operation of the dispensing mechanism 158. At least a portion of the drive gear 220 may be configured to fit within a slot 222 at the chassis 210. The drive gear 220 may be rotatably connected to a drive gear pivot 223 for arcuate or other translational movement within said slot 222. A drive gear spring 224 may exert forward forces on said drive gear 220 such that drive gear 220 is normally advanced within said slot 222 towards said paddle arm 202, such as but not limited to, counterclockwise about said drive gear pivot 223. The drive gear spring 224 in exemplary embodiments, without limitation, may comprise a torsion spring.

A dog pivot block 226 may be located at said chassis 210. The dog pivot block 226 may be placed in the normal travel path of the dog 216 and may be configured to cause rotational movement of said dog 216 upon contact or other frictional engagement between said dog 216 and said dog pivot block 226. In exemplary embodiments, without limitation, the dog pivot block 226 may be positioned to contact a lower portion of said dog 216 such that said dog 216 is caused to rotate clockwise about said dog pivot 218 upon such contact.

For example, without limitation, user contact with said contact section 146 may result in counterclockwise movement of said paddle arm 202 about said paddle arm pivot 208. Movement of the paddle arm 202 may cause inward movement of said dog 216. Sufficient movement of said paddle arm 202 may cause said dog 216 to contact said drive gear 220. As the paddle arm 202 is further advanced, the dog 216 may continue to move inward, thereby forcing said drive gear 220 along said slot 222. The dog 216 may, during such inward movement, come to contact said dog pivot block 226 and be rotated clockwise such that an upper portion of said dog 216 dips below a lower portion said drive gear 220, thereby providing sufficient clearance for said drive gear 220 to rapidly advance within said slot 222. The advance of said drive gear 220 may be cause by forces exerted by said drive gear spring 224. As the user removes the exerted force from the paddle arm 202, the paddle arm 202 may be reset by clockwise rotational movement about said paddle arm pivot 208, such as by forces exerted by said paddle arm spring 212.

A dog spring 228 may extend between said dog 216 and said paddle arm 202. In exemplary embodiments, without limitation, the dog spring 228 may be connected at a first end to a portion of said dog 216 proximate to said contact section 146 and may be connected at a second end to a distal end of the connector 206. The dog spring 228 may be configured to exert forces on said dog 216 configured to normally cause counterclockwise movement of said dog 216 about said dog pivot 218. For example, without limitation, as the paddle arm 202 is reset, the dog spring 228 may reset the dog 216.

The paddle arm 202, such as but not limited to the connector 206, may be configured to prevent the dog 216 from rotating counterclockwise beyond a certain point. In this way, upon reset the dog 216 may be oriented to contact the drive gear 222 when said paddle arm 202 is again advanced.

A damper 234 may be located at a distal portion of said paddle arm 202. In exemplary embodiments, the damper 234 may comprise a number of teeth located at a distal end of said connector 206. A damper gear 236 may be positioned to engage said damper 234. The damper gear 236 may comprise a gear and/or a damping device and be connected to the chassis 210. The damper gear 236 may be configured to slow the movement of said paddle arm 202 as the paddle arm 202 resets upon removal or decrease of user exerted forces. For example, without limitation, the damper gear 236 may comprise a resistance device, such as but not limited to, a spring, frictional device, hydraulic device, air spring, some combination thereof, or the like to arrest movement of the paddle arm 202. In exemplary embodiments, other components of the dispensing mechanism 158 may be moved to reset positions while said paddle arm 202 is still moving into the reset position. One or more adjustment devices may be provided which permit adjustment of the damping forces exerted on the paddle arm 202, and thus the time it takes for the paddle arm 202 to reset.

Figure 10:
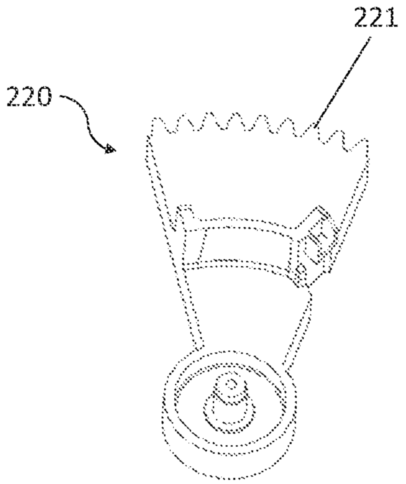
FIG. 10 is a front perspective view of the drive gear of the dispensing mechanism of FIGS. SA-8D.

The drive gear 220 may be mechanically connected to a roller 250. For example, without limitation, sufficient movement of the drive gear 220 (e.g., from sufficient movement of said paddle arm 202) may be configured to cause rotational movement of said roller 250, thereby resulting in dispensation of a single one of said first items 92. In exemplary embodiments, the drive gear 220 may be directly connected to said roller 250. Referring to FIG. 10, an exemplary embodiment of a drive gear is shown. The drive gear may comprise a series of teeth 221 on its upper end. The teeth 221 may engage with a roller gear 264 on a roller 250 to cause rotational movement of the roller 250. In other exemplary embodiments, gears, members, linkages, cams, or the like may connect said drive gear 220 to said roller 250. In exemplary embodiments, actuation of the paddle arm 202 may be configured to cause movement of the roller 250 from approximately a 10 o'clock position to a 6 o'clock position to dispense a product 92, such as by way of contact between the dog 216 and the drive gear 220. During such advancement, such as when the dog 216 slips below the drive gear 220, the roller 250 may return to the 6 o'clock position to receive another product 92.

The damper gear 236 may be configured to arrest the reset of the paddle arm 202 after such dispensation such that rapid dispensing of first items 92 may be prevented. In this way, a second one of said first items 92 may only be dispensed after a period of time. Alternatively, or additionally, the damper gear 236 may be configured to allow other components of the dispensing mechanism 158 to reset while the paddle arm 202 returns to the rest position.

In exemplary embodiments, a guide 238 may extend from an intermediate portion of said paddle arm 202. The guide 238 may be received within a receiver 240 attached to said chassis 210. The guide 238 and receiver 240 may be configured to secure positioning of said paddle arm 202, in particular such that said dog 216 is properly aligned with said drive gear 220. For example, without limitation, the guide 238 may comprise a protrusion extending substantially perpendicular from said connector 206 and said receiver 240 may comprise a three-sided member or series of members configured to receive said protrusion of said guide 238 between said chassis 210 and said three sides of said receiver 240.

In some embodiments, the delay rate (e.g. controlled rate of dispensing) may be adjusted. For example, and without limitations, one or more gear parameters (e.g., gear diameter, number of teeth of the gear, etc.) of one or more of the gears (e.g., drive gear 220, damper gear 234, roller gear 264, or the like) and/or spring parameters of the paddle arm spring 212 (e.g., spring wire diameter, spring index, spring length, spring solid height, number of spring coils, spring pitch, spring rate, or the like) may be adjusted to cause a higher or lower controlled rate of dispensing.

In exemplary embodiments, a time delay adjustment mechanism may be provided which adjusts the amount of time the first item dispensing mechanism 158 takes to reset to the second position following placement in the first position. For example, without limitation, the time delay adjustment mechanism may comprise a knob or other device configured to adjust the amount or force exerted by said paddle arm spring 212 against said paddle arm 202.

Figure 11:
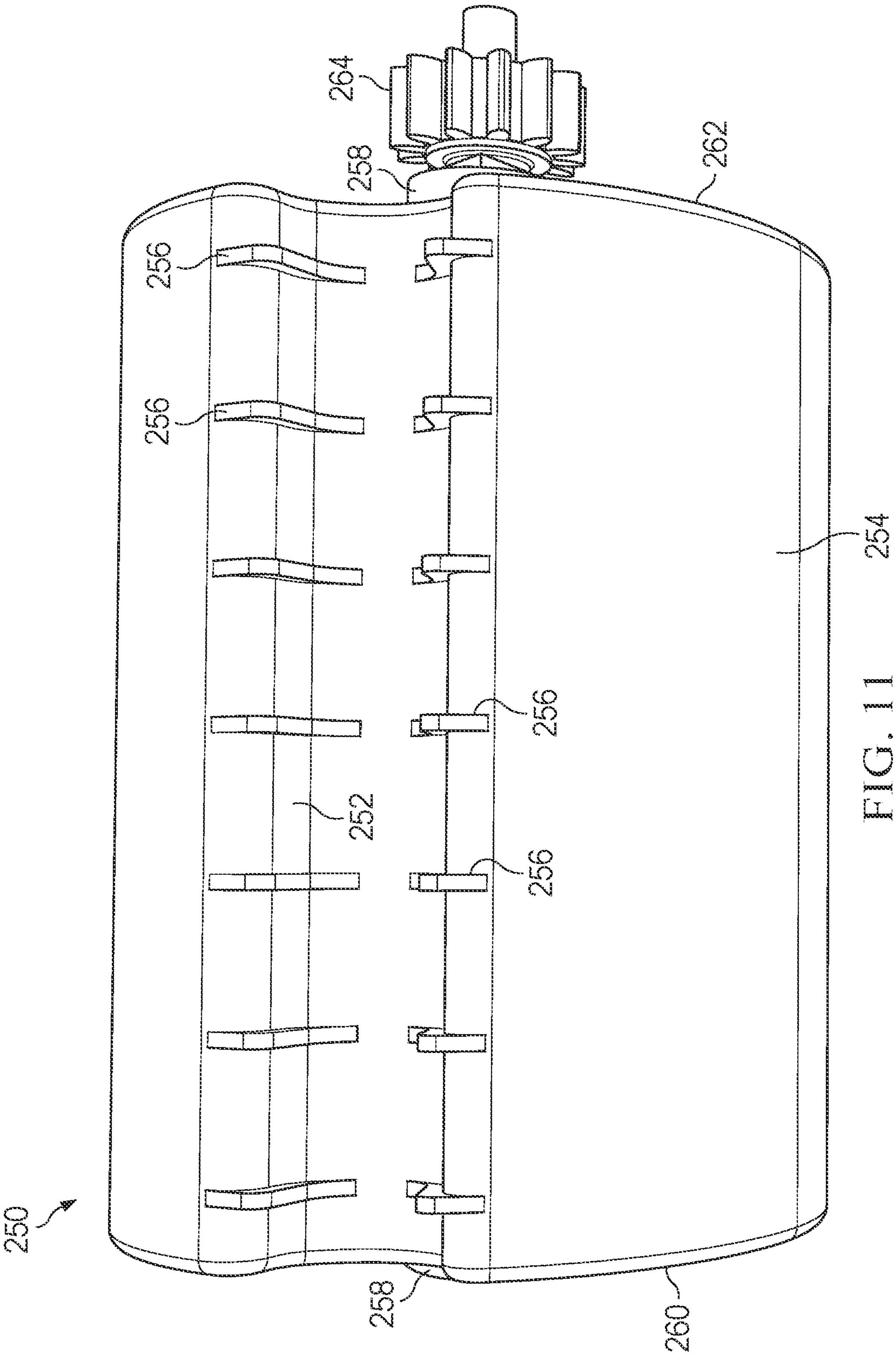
FIG. 11 is a front perspective view of an exemplary embodiment of a roller.
Figure 12:
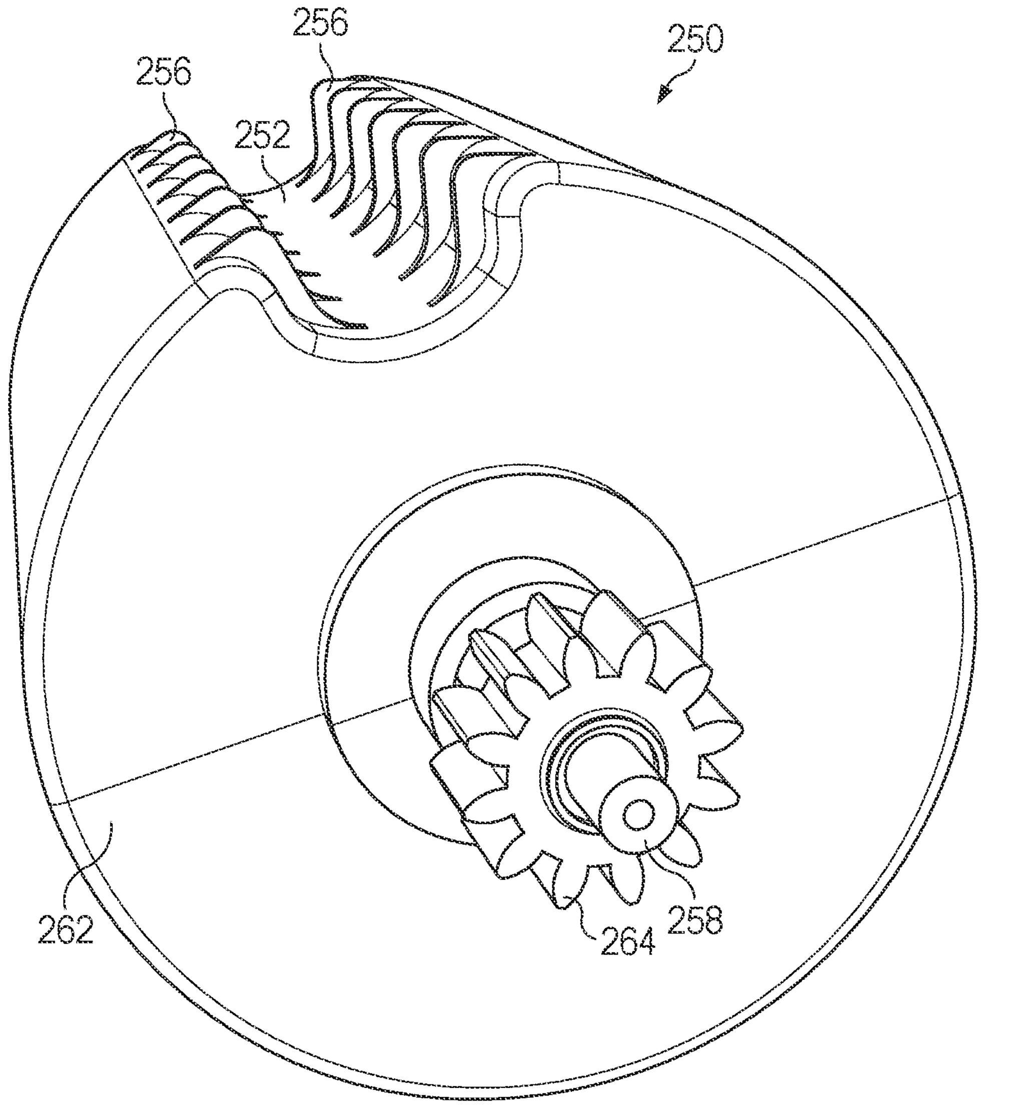
FIG. 12 is a right-side perspective view of the roller of FIG. 9.

Referring to FIGS. 11 and 12, a roller 250 according to an exemplary embodiment is shown. The roller 250 may be associated with a first dispensing mechanism 158. The roller 250 may have a generally cylindrical shape and may comprise an axial groove 252 extending along at least a portion of the length of its outer surface 254. Along a length of the groove 252 a series of paired guides 256 may extend from opposite sides of the groove 252. The guides 256 may prevent more than one item 92 from entering the groove 252 during an actuation cycle, thereby reducing or preventing the dispensing assembly from jamming and being rendered inoperable. The roller 250 may comprise a spline shaft 258 that terminates outside of the inner and outer ends 260, 262 of the roller 250. The spline shaft 258 of the cylinder may be coupled directly to the roller gear 264, such that when the roller gear 264 rotates (e.g., in response to actuation) the roller 250 rotates. The outer end of the spline shaft 258 may be held in place by a ball bearing assembly inserted into an aperture in the chassis 210. The inner end of the spline shaft 258 may be held in place by way of a clam shell fit or other frictional engagement with the chassis 210.

During actuation, movement of the roller gear 264 may be configured to cause rotational movement of the roller 250. During rotation, the groove 252 may be aligned with the bottom end of the chute 154, and a tampon or other product 92 may be aligned sufficiently with the groove that it is able to drop from the chute 154 into the groove 252, such as by gravitational forces. The depth of the groove 252 may be sized such that only one item is able to fit entirely or partially within the groove 252, and the ability of two or more items to fit into the groove 252 is prohibited. As the roller 250 continues to rotate, the grove 252 may be moved away from the chute 154 and towards the dispensing area. Any product contained within the groove 252 may be prevented from being ejected from the groove 252 prior to arriving at the dispensing area, such as by shape of the housing 112, other shield, or component. When the roller 250 has rotated to a position where the groove 252 is aligned with the dispensing area, product within the groove 252 may be ejected. The roller gear 264 may be sized such that movement of the roller gear 264 is configured to cause the roller 250 to achieve appropriate and sufficient rotation to dispense any product within the groove 252 each time an actuation cycle occurs. Accordingly, a product may be transported by the roller 250 to the dispensing area 138 each time an actuation cycle occurs.

Figure 13A:
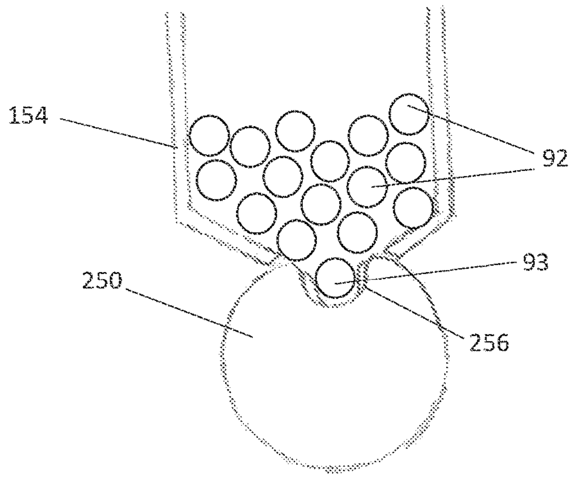
Figure 13B:
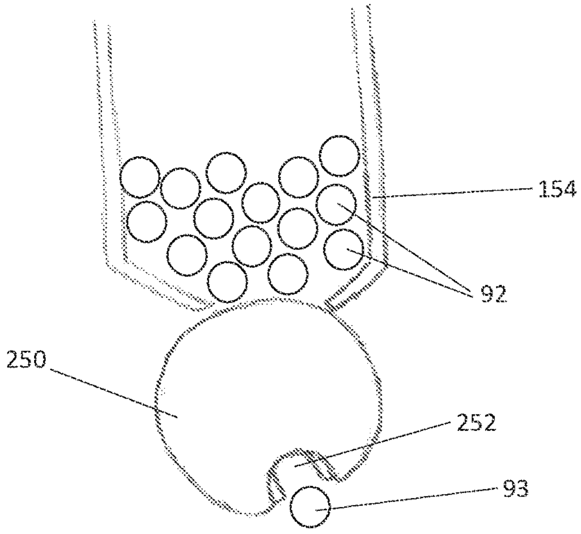

Referring to FIGS. 13A and 13B, a cross-section of the roller 250 and bottom end 164 of the chute 154 are illustrated during two points in time of an actuation cycle. In FIG. 13A, a particular item 93 located among a plurality of items 92 at the bottom end 148 of the chute 144 has settled into the groove 252 of the roller 250. The bottom of the end 148 of the chute 144 is proximate enough to the surface of the roller that items other than the particular item 93 cannot escape the chute without first entering the roller 250. Referring to FIG. 13B, the roller 250 has rotated and the item 93 is ejected from the groove 252. The roller 250 may be rest into the first position shown in FIG. 13A during said actuation cycle, such as by reverse movement of said roller 250.

In other exemplary embodiments the roller may have more than one groove for receiving a tampon or other product. A roller could have multiple grooves to dispensing multiple items on each actuation cycle, or hold one or more products during a cycle while only one product is ejected into the dispensing area. The roller could also have a groove designed to fit more than one product at a time. One of ordinary skill in the art will recognize that a variety of different types of rollers and tumblers with different types of grooves, slots, and apertures could be configured to dispense items from one or more chutes into the dispensing area.

The roller 250 may comprise a unitary molded piece or be constructed from one or more pieces of plastic or other materials. The roller may be hollow or solid. In an exemplary embodiment the outer surface 254 of the roller 250 is smooth.

Figure 14A:
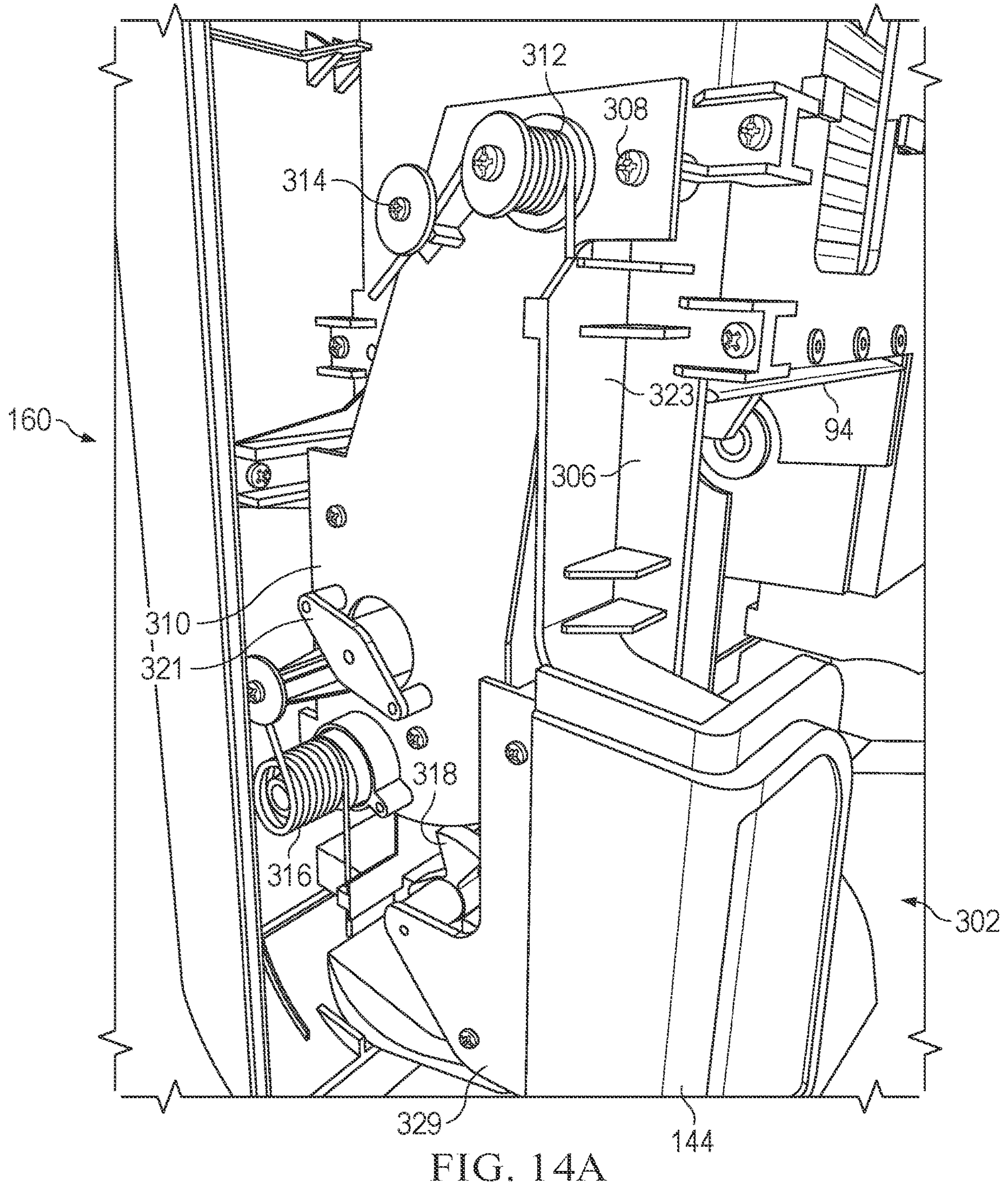
FIGS. 14A-14D illustrate a second dispensing mechanism of an exemplary embodiment in various stages of actuation.
Figure 14B:
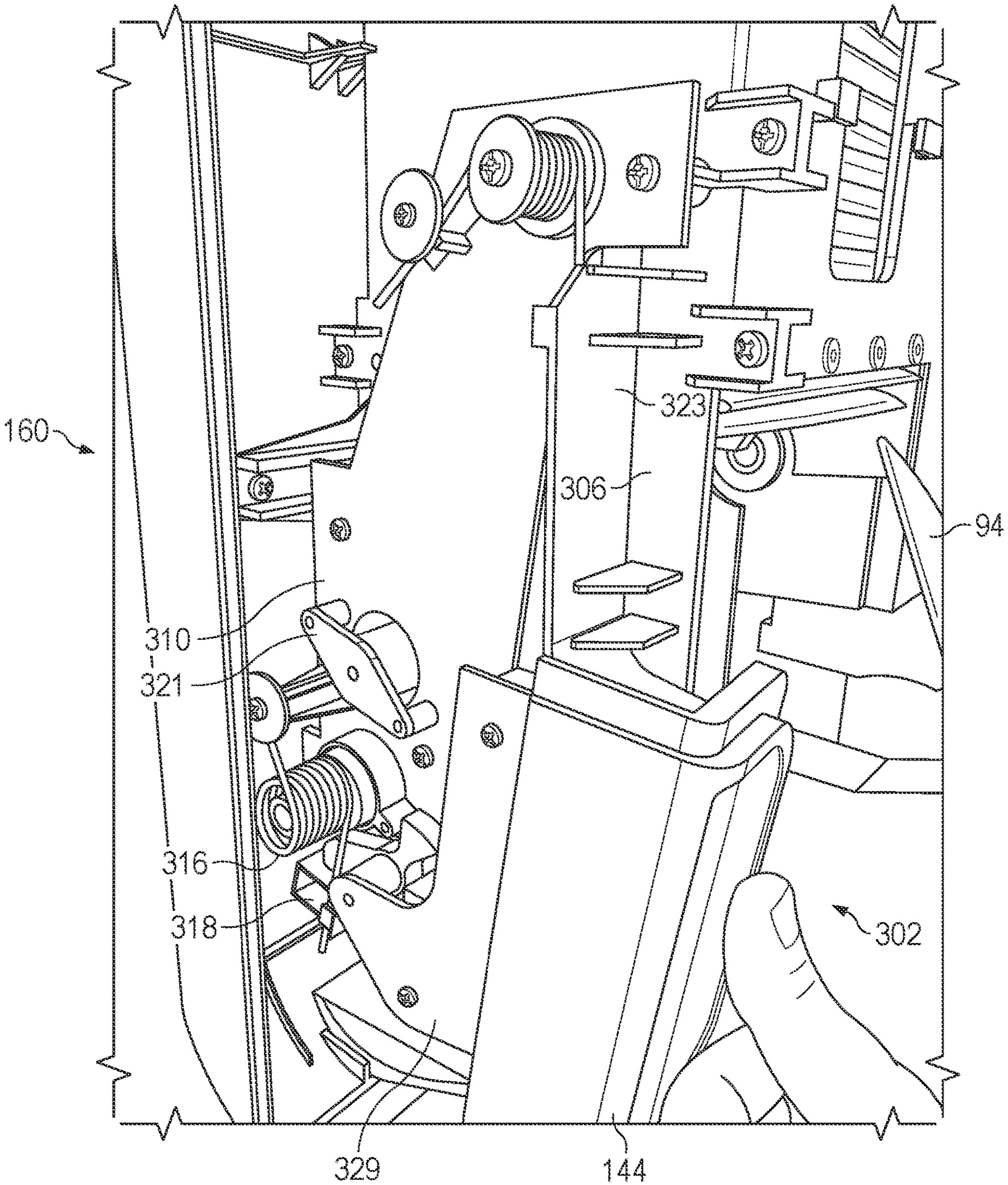
Figure 14C:
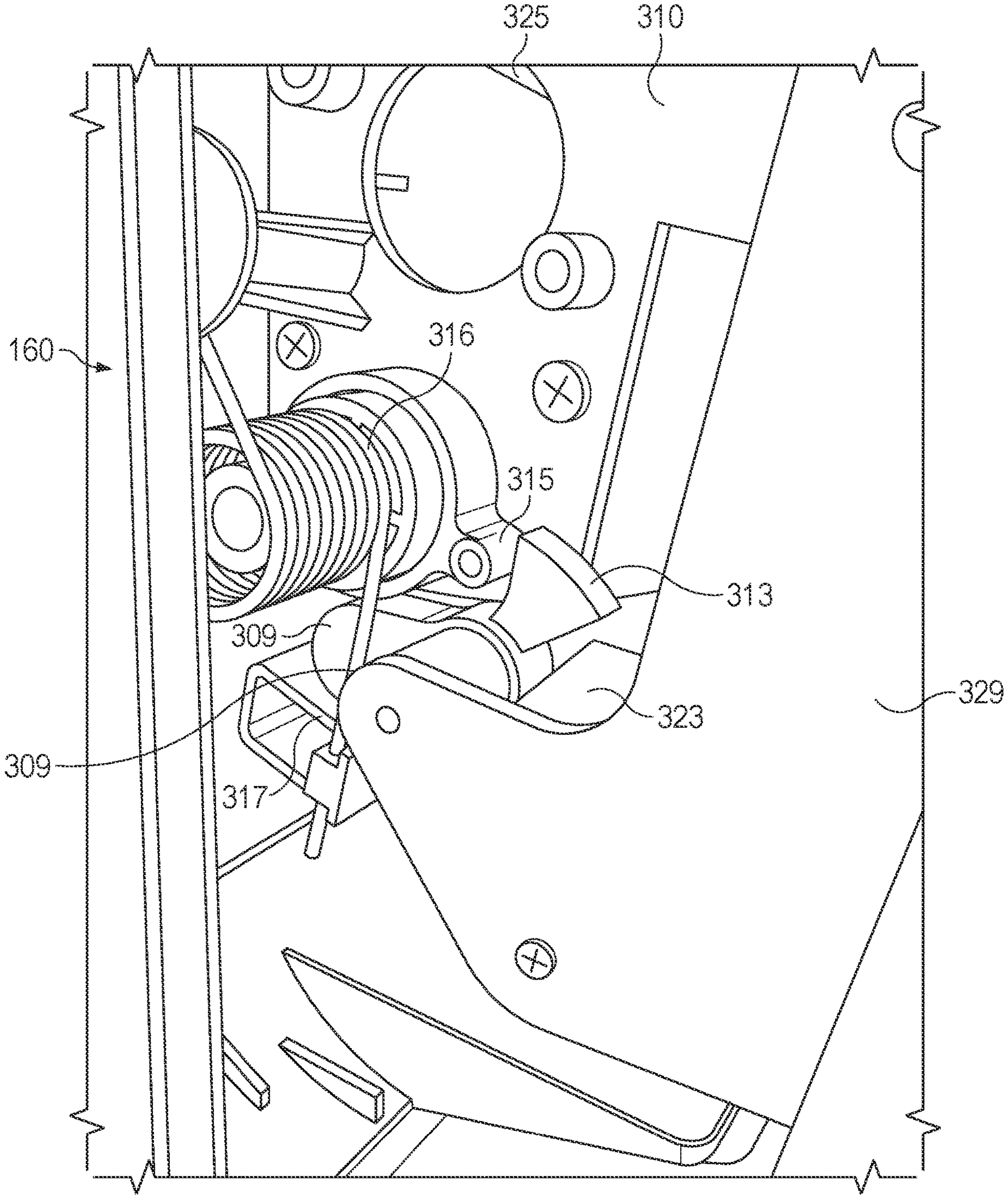
Figure 14D:
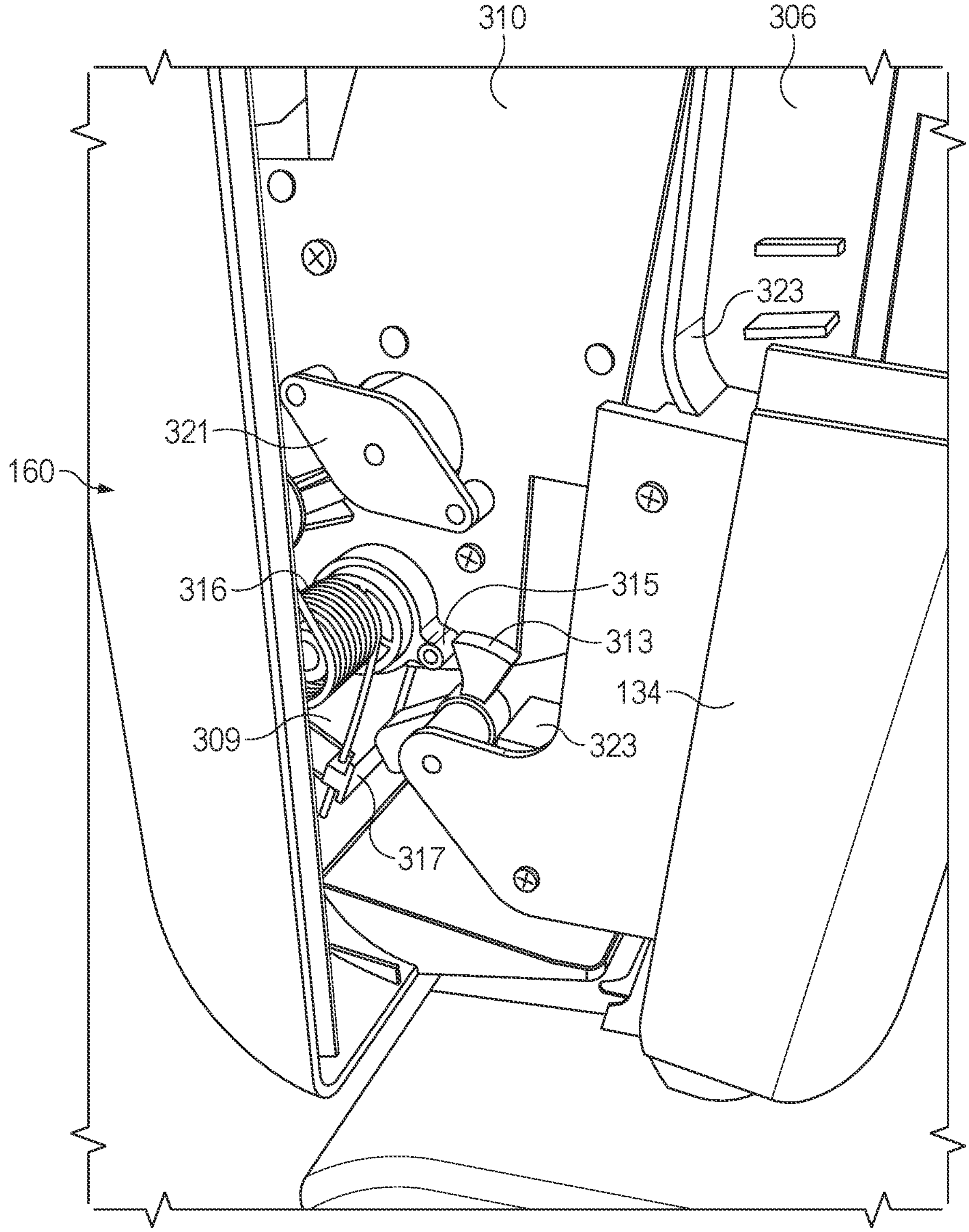

FIG. 14A illustrates a side view of a second item dispensing mechanism 160 of said system 100 in a resting position. FIG. 148 illustrates said second item dispensing mechanism 160 in a partially advanced position where said second item dispensing mechanism 160 is partially actuated by user force exerted at a second contact section 144 (paddle button). FIG. 14C illustrates said second item dispensing mechanism 160 in a fully advanced position (damper gear 321 omitted). FIG. 14D illustrates said second item dispensing mechanism 160 in a partially reset position.

The second item dispensing mechanism 160 may be configured to translate user actuation of a paddle arm 302 into release of a second type of item 94, which may be a packaged personal care product such as a pad or PPE such as gloves. The paddle arm 302 may comprise a contact section 144 located at a distal portion of said paddle arm 302 which is configured to be pressed or otherwise actuated by a user. The paddle arm 302 may comprise a connector 306, which may be pivotally mounted to a paddle arm pivot 308. The paddle arm 302 may be configured for rotational movement about some or all of said paddle arm pivot 308. The contact section 144 may be located at a distal end of a connector 306.

The paddle arm pivot 308 may be located at a chassis 310. The chassis 310 may be a substantially planar member. In exemplary embodiments, the paddle arm pivot 308 may comprise a cylindrically shaped shaft configured to receive said connector 306.

A paddle arm spring 312 may be located or otherwise connected to said chassis 310. The paddle arm spring 312 may be configured to exert forces on an upper portion of said paddle arm 302 which normally cause said paddle arm 302 to rotate counterclockwise towards a user. In exemplary embodiments, the paddle arm spring 312 comprises a torsion spring. A first portion of said second paddle arm spring 312 may be connected to, or otherwise frictionally engage, said paddle arm 302. A second portion of said second paddle arm spring 312 may be connected to, or otherwise frictionally engage, a stop 314.

When said paddle arm 302 is actuated by said user, such as by user depression of said contact section 144, the paddle arm 302 may rotate clockwise.

Figure 15:
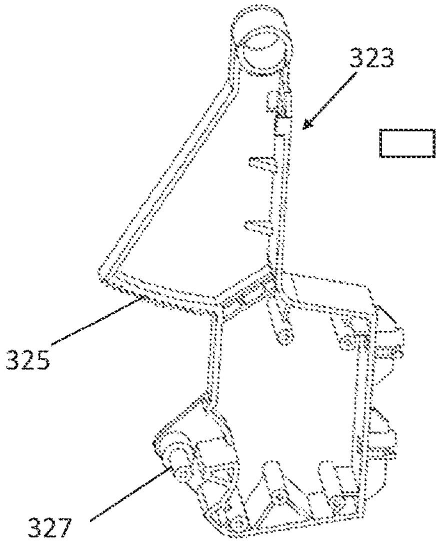
FIG. 15 is a front perspective view of a drive gear of the dispensing mechanism of FIGS. 14A-14D.

Referring to FIG. 15, a drive gear 323 is shown. The driver 323, in exemplary embodiments, may be located behind at least a portion of, and/or form at least a portion of the paddle arm 302. The driver 323 may comprise a series of teeth 325. The teeth 325 may be configured to engage the damper gear 321. The damper gear 321 may be located at said chassis 310. At least a portion of the damper gear 321 may protrude through said chassis 310. In exemplary embodiments, the damper gear 321 may be identical to the damper gear 236 associated with the first dispensing mechanism 158. The damper gear 321 may be configured to engage said teeth 325 to slow movement of said paddle arm 302 when said paddle arm 302 is returning to the rest position. The teeth 325 may act as a damper. The damper gear 321 may be configured to provide at least several seconds of delay such that said second dispensing mechanism 160 may be reset while said paddle arm 302 returns to said rest position. In exemplary embodiments, the damper gear 321 may be actuated to adjust the time delay.

Figure 16:
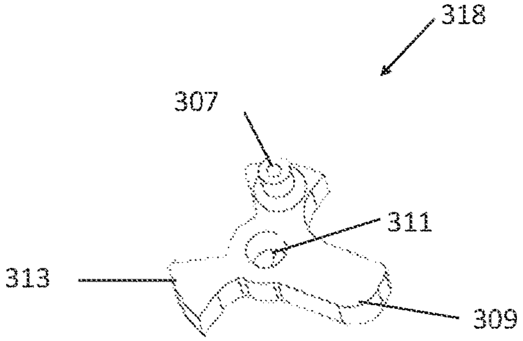
FIG. 16 is a front perspective view of the dog of the dispensing mechanism of FIGS. 14A-14D.
Figure 17:
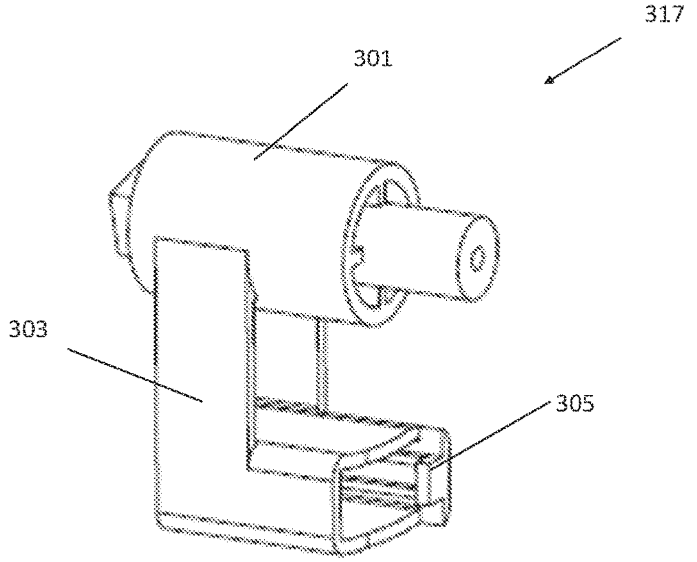
FIG. 17 is a left side perspective view of a drive arm of the dispensing mechanism of FIGS. 14A-14D.
Figure 18:
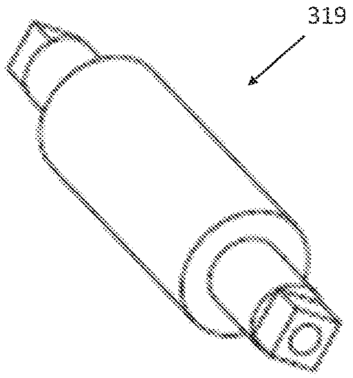
FIG. 18 is a front perspective view of a shaft of the dispensing mechanism of FIGS. 14A-14D.

The chassis 310 may be shaped to prevent said paddle arm 302 from rotating beyond a certain point. A dog 318, such as illustrated in FIG. 16, may be connected to said paddle arm 302. In exemplary embodiments, the dog 318 may comprise an aperture 311 configured to be received at a protrusion 327 at said driver 323. This may permit rotational movement of said dog 318 about said protrusion 327. Alternatively, or additionally, this may permit movement of said paddle arm 302 to be translated to movement of said driver 323, and thus movement of said dog 318. A cover 329 may be secured to a side portion of said driver 323. The cover 329 may assist in securing said dog 318 to said protrusion 327. A drive arm 317, such as illustrated in FIG. 17, may be mechanically connected, directly or indirectly, to a conveyor 360, such as by way of a shaft 319 illustrated in FIG. 18, and placed in the path of at least a portion of the dog 318 such that rotational movement of the paddle arm 302 is translated into movement of said dog 318, which contacts and moves said drive arm 317 to move said conveyor 360.

A second spring 316 may be located at a lower portion of said chassis 310 and may be configured to exert forces against said drive arm 317 as it is advanced by way of said paddle arm 302. Said second spring 316 may comprise a torsion spring, although other types of springs may be utilized. Said second spring 316 may be configured to provide forces which reset said paddle arm 302 once user forces against said paddle arm 302 are released or sufficiently decreased.

Figure 19:
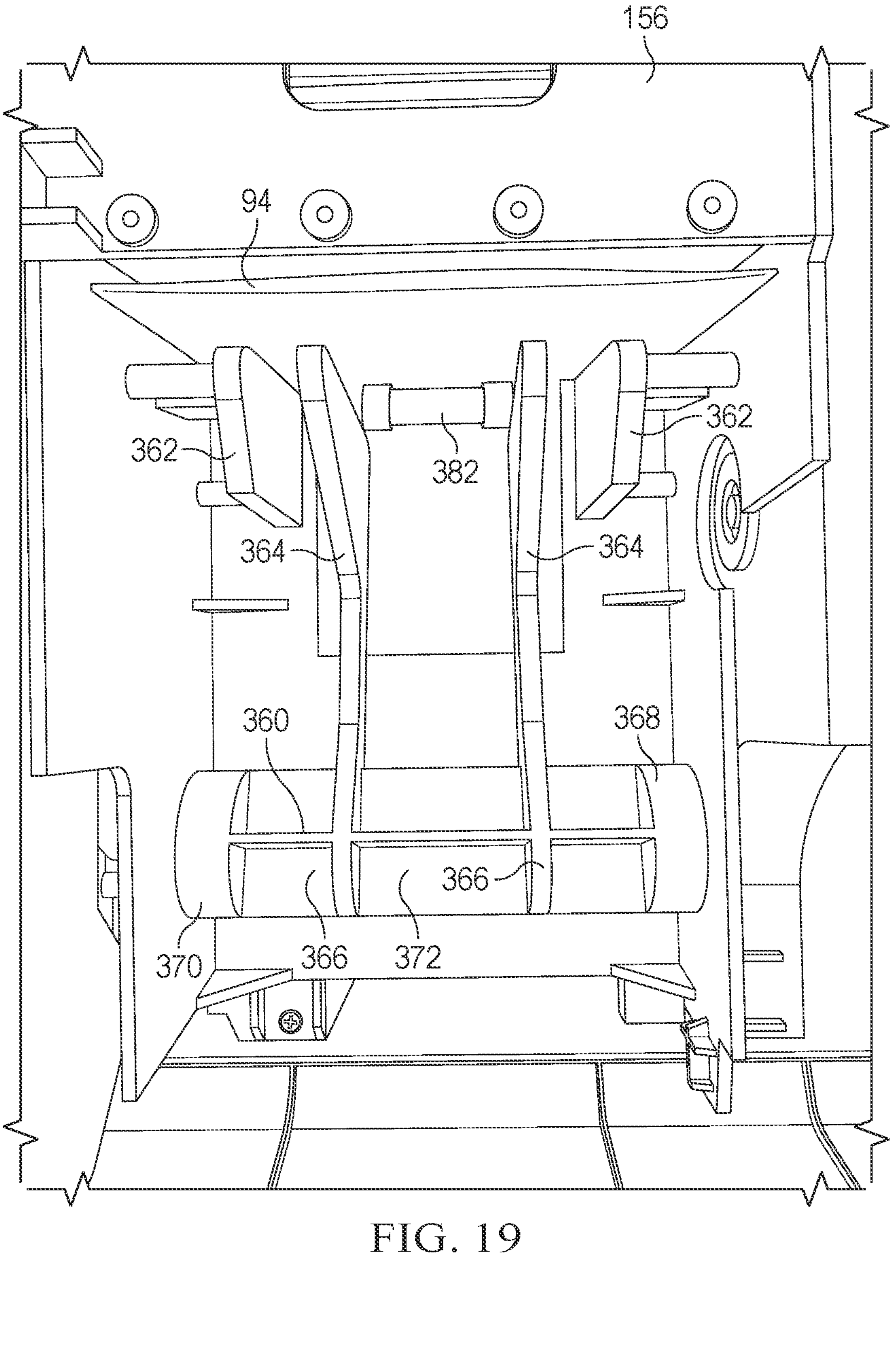
FIG. 19 is a front perspective view showing a portion of the second dispensing mechanism.
Figure 20:
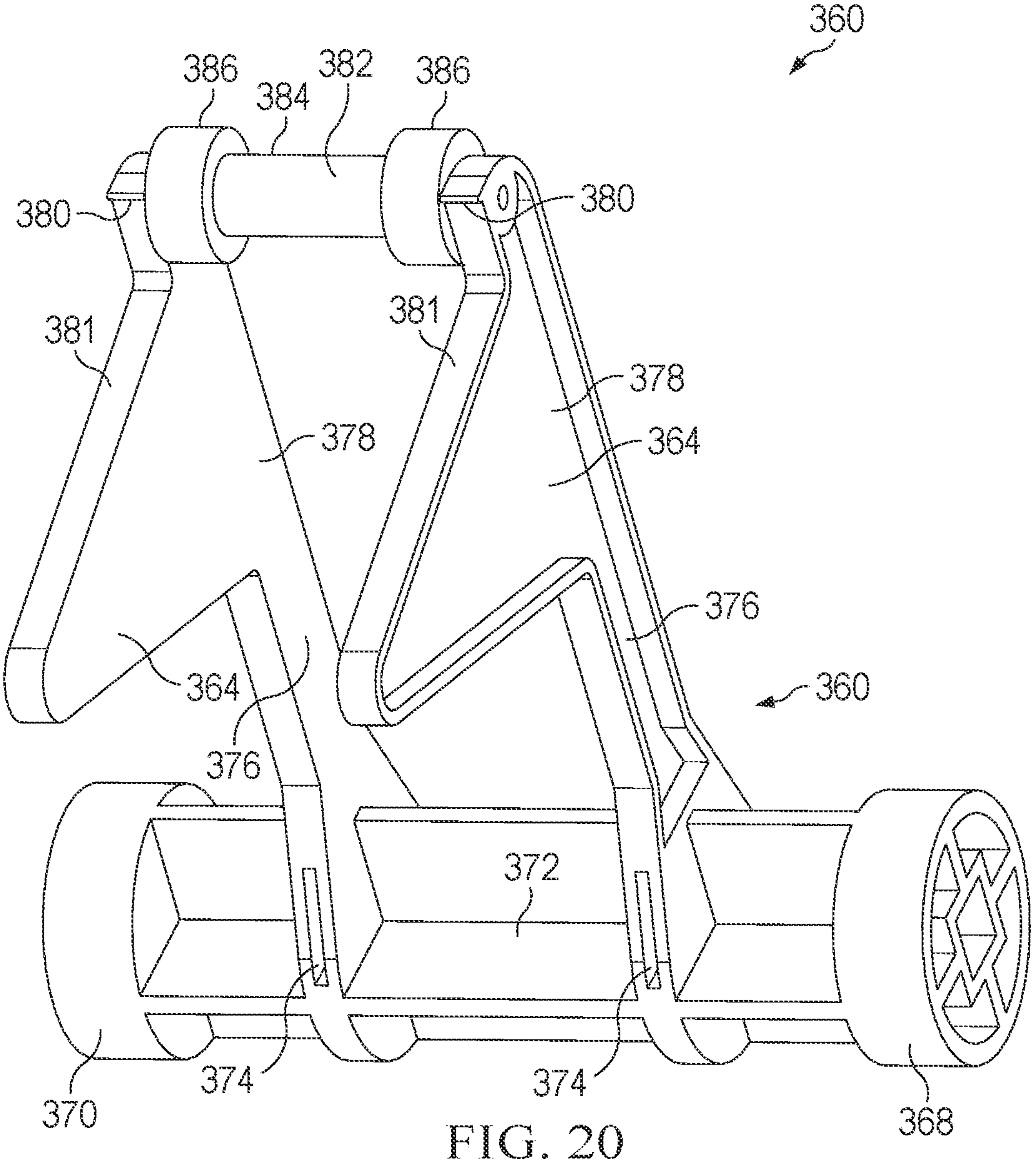
FIG. 20 is a front perspective view of a conveyor of the second dispensing mechanism.

Referring to FIGS. 19 and 20, the dispensing assembly may further comprise the conveyor 360 and supports 362. The conveyor 360 may comprise a pair of hooks 364, each of which may extend in radial fashion from a base shaft 366. The base shaft 366 may have a first end 368 and a second end 370, and a middle portion 372. The hooks 364 may be oriented in parallel fashion, with each hook 364 extending outward from the middle portion of the base shaft 366. Each hook 364 may comprise a lower portion 374 where it connects to the base shaft 366, a neck 376, and a generally triangular head 378 that extends in a forward direction out from a middle portion of the neck 376. Located on the top surface of the heads 378 may be receiving surfaces 381. Extending outward from the top of the heads 378 in a forward direction may be a prong 380.

Disposed between the hooks 364 may be a roller bar assembly 382 comprising a shaft 384 and two or more pad rollers 386. The roller bar assembly 382 may be rotatably attached on each end to the hook heads 378.

In exemplary embodiments, two supports 362 may extend from said chassis 310. The supports 362 may be positioned below said chute 156 to support said products 94 within said chute 156. Advancement of the conveyor 360 may cause a lowermost one of said products 94 to be dispensed. Spacing between a bottom of the chute 156 and the supports 362 may be configured to only permit dispensing of a single one of the products 94 upon movement of the conveyor 360. A subsequent product 94 may then drop into place on the supports 94 such as by gravitational forces. In exemplary embodiments, prongs 380 may be configured to contact said second product 94 upon movement of said conveyor 360 to advance the second product 94 to a dispensing area.

In exemplary embodiments, as the paddle arm 302 is advanced, the dog 318 is advanced. The dog 318 may be advanced, for example without limitation, by advancement of the driver 323 attached to said paddle arm 302. At some point, a second portion 309 of the dog 318 may contact the drive arm 317. As the paddle arm 302 is advanced, the second portion 309 may advance the drive arm 317. In particular, for example and without limitation, the second portion 309 may be configured to contact a lower portion 305 of said drive arm 317 to cause counterclockwise rotational movement of said drive arm 317 as said dog 318 is advanced.

Such movement of said drive arm 317 may be configured to cause clockwise rotational movement of a drive shaft 301 of said drive arm 317, which may be connected to the lower portion 305 by an arm 303. Such rotational movement of the drive shaft 301 may be configured to, directly or indirectly, cause rotational movement of said conveyor 360. For example, without limitation, the drive shaft 301 may be mechanically connected to the first or second end 370, 368 of the conveyor 360. In this way, clockwise rotational movement of the drive arm 317 may be configured to cause clockwise rotational movement of said conveyor 360 to dispense one of said second products 94. In exemplary embodiments, the drive arm 317 may be connected to the conveyor 360 by way of the shaft 319.

Upon sufficient movement of said dog 318, a first portion 313 of the dog 318 may contact a protrusion 315 extending from the chassis 310. Such contact, as the dog 318 is further advanced, may result in clockwise movement of the dog 318. This may result in the second portion 309 of the dog 318 moving above said lower portion 305 of said drive arm 317. This may permit reset of said drive arm 317, such as by way of said drive arm spring 316, which may provide opposing forces to said drive arm 317. A spring or other force exerting device may connected a third portion 307 of the dog 318 to the chassis 310 and/or the paddle arm 302 and may be configured to reset said dog 318 when said second portion 309 of said dog 318 clears the lower portion 305 of the drive arm 317. In exemplary embodiments, the dog 318 may clear the lower portion 305 of the drive arm 317 as the paddle arm 302 returns to the rest position. For example, without limitation, the dog 318 may be connected to said driver 326, which may be connected to, or form a portion of, said paddle arm 302 such that movement of said paddle arm 302 is translated to movement of said dog 318. The resetting movement of said drive arm 317 may cause return of the conveyor 360. Gravity may cause a second one of said second products 94 to fall into place, such as onto the supports 362.

Figure 21A:
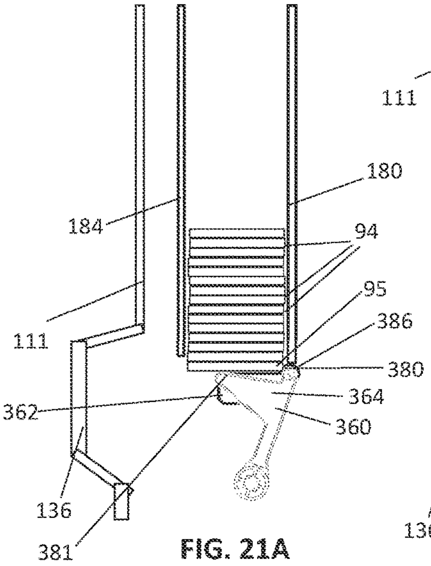
FIGS. 21A-21C illustrate a cross-sectional view of the conveyor of the dispensing mechanism during different stages of actuation.
Figure 21B:
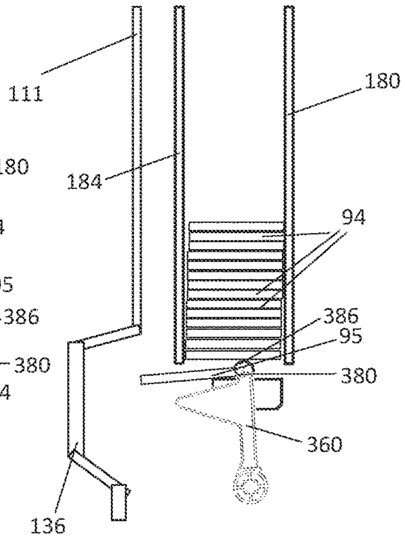
Figure 21C:
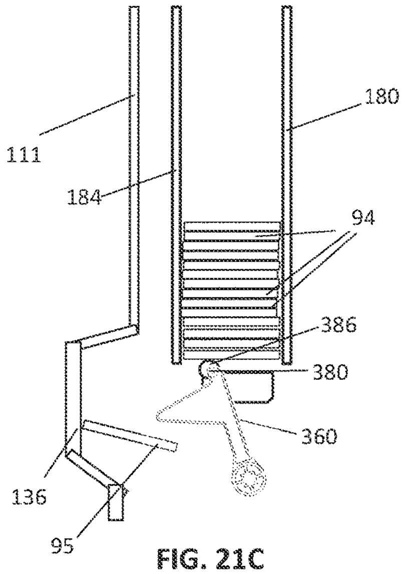

Referring to FIGS. 21A-21C, a cross-sectional view of the dispensing mechanism 160 is illustrated and depicts the operation of the conveyor 360 during three different stages of actuation. FIG. 21A illustrates the placement of the conveyor 360 in a resting position where no, or insufficient user force has been applied to the contact section 144 and the paddle arm 302 is in its resting state. Multiple second items 94 are stacked in the chute 156. The prongs 380 on each of the hook heads 378 (only one shown) rest behind the lowest second item 95 in the chute 156. The bottom pad rests upon a portion of the receiving surfaces 381 of the hook heads, and the supports 362 on either side of the conveyor. When in a resting position the conveyor 360 may be slighted tilted backward such that only the prongs 380 and a minor portion of the receiving surfaces 381 are touching the second item 95. The relative orientation of the prongs 380 to the bottom pad allow the conveyor 360 push the pad forward across the supports when the conveyor 360 is actuated. FIG. 21B illustrates the placement of the conveyor 360 in an advanced position where the paddle arm 302 has been advanced due to user force on the contact section 144, causing rotation of the shaft 366 of the conveyor 360, and causing a pad to be ejected from the chute 156 and fall into the dispensing area. When the second item 95 is ejected from the chute, it may exhibit sufficient forward movement to make contact with the recess 136 of the front cover 116. The recess 136 may dampen the forward movement of the item and allow the item to rebound off the recess 136 and fall into the dispensing area 138. When fully activated the conveyor is at its forward most position. Once the conveyor 360 has reached its fully activated position and caused ejection of an item from the chute, the conveyor 360 may return to its resting position towards the back of the housing. The conveyor 360 may rotate forward far enough to ensure that the second item 94 is no longer supported by the supports 362 and is otherwise entirely removed from the chute. FIG. 21C illustrates the placement of the conveyor 360 in an intermediary position between said resting and advanced positions, as the conveyor 360 returns to its original resting position after dispensing a pad. The movement of the conveyor 360 from a fully activated position back to its resting position may be regulated by the time delay caused by the damper gear. The rollers 386 on the roller bar assembly 382 may allow the conveyor 360 to more easily move underneath the one or more second items located in the chute as it returns to its resting position. In an exemplary embodiment, the rollers 386 have a smooth outer surface that reduces friction experienced by the conveyor 360 as it moves underneath the second items 94 stacked in the chute 156.

In exemplary embodiments, the dispensing unit is configured to dispense two different types of products. In different embodiments the dispensing unit may contain two or more different dispensing assemblies for dispensing two or more different types of products, which may be personal care products and/or PPE. This may allow for a single unit that may, for example, be mounted to a wall in a bathroom and dispense both pads and tampons. One of ordinary skill in the art will easily recognize, however, that in other embodiments a dispensing unit may contain only a single dispensing assembly for dispensing one type of product, or may contain two dispensing assemblies that dispense the same type of product. For example, a single dispensing unit could have two dispensing assemblies that each dispense pads. In another example, a dispensing unit could dispense face masks and sanitizing wipes. In yet another example, two dispensing units could be used in proximity to one another (such as mounted together on a wall) where each dispensing unit only dispenses a single type of personal care product or PPE. One of ordinary skill in the art will recognize that the assemblies described above and illustrated in FIGS. 1-19 could be uncoupled and housed in separate dispensing units, without departing from the scope of the invention.

Systems and devices described herein may also be configured to be compliant with the Americans with Disabilities Act (ADA). For example, paddle buttons and any other components may comply with braille standards set by the ADA.

While the dispensing systems described herein include free-vend devices (those that do not require payment to be received in order to dispense a product), one of ordinary skill in the art will recognize that different embodiments could easily be configured to require payment before dispensing one or more products. Required payment could be in in a variety of forms including but not limited to paper money, coins, and card payments. In some embodiments a dispensing unit may require payment prior to dispensing one type of product but be configured as free-vend for another type of product.

While in some embodiments the dispensing unit and one or more assemblies therein are manually operated, in other embodiments the dispensing units may be electronically operated. For example, and without limitation, the dispensing units may include electronic componentry sufficient to allow actuation to be initiated by a motion sensor, or by receiving a signal over a network. Motion sensors on a dispensing unit may allow a product to be dispensed to a user in response to the wave of a hand or other movement near the unit. In some embodiments with two or more dispensing assemblies within a single unit, one or more of the dispensing assemblies may be manually operated with one or more other assemblies are electronically operated.

In an exemplary embodiment the dispensing unit is configured to be mounted on a wall or other vertical structure, including but not limited to a cabinet or pedestal. In some embodiments the dispensing unit may be freestanding. One of ordinary skill in the art will recognize that the dispensing unit may be mounted, hung, coupled, or otherwise incorporated to a variety of structures for use in a variety of environments.

The dispensing unit may be manufactured from a variety of materials, including plastic and metal. In an exemplary embodiment many of the components of the dispensing unit are formed from HOPE. One of ordinary skill will recognize that many of the components of dispensing unit can be manufactured from a variety of materials without departing from the scope of the invention.

An exemplary embodiment of product packaging for use with a dispensing unit is shown in FIGS. 22-25. The product packaging can be configured into an envelope structure 408 having an inner surface 409 and an outer surface 420. In an exemplary embodiment, the envelope structure is further comprised of a face panel 412, bottom panel 414, top flap 416, and a pair of opposed side flaps 418. The face panel 412 has a rectangular perimeter defined by a top edge 420, bottom edge 422, and two side edges 424. Each of the side flaps 418 is integrally connected to the face panel 412 at first and second fold lines 426, 428 located along the front panel side edges. The bottom panel 414 is integrally connected to the face panel bottom edge 422 at a third fold line 430. The top flap 416 is integrally connected to the face panel top edge 420 at a fourth fold line 432. To achieve a closed position the bottom panel 414 is folded along the bottom edge 422 to overlie a portion of the inner surface of the face panel 412. The side flaps 418 may then be folded along fold lines 426 and 428, and the top flap 416 folded over along the fourth fold line 432. Adhesive applied to one or more surface areas of the envelope structure prior to or after folding may secure the envelope in a closed position. In an exemplary embodiment an envelope structure in a fully closed position has a length L1 in the range of 100-105 mm and a width WS of approximately 120 mm. The design of the envelope structure, allows the package to flex in response to added pressure and decrease in thickness. For example, when filled with a pad an envelope structure 408 in a fully closed position may exhibit a middle thickness of a 12 mm, which may be decreased to approximately 9-8 mm when pressure is applied to the face panel or bottom panel (as experienced when a product is in a chute below a plurality of other products). This is about one third of the thickness of conventional rigid box packaging for pads for dispensers, and allows exemplary dispensing assemblies described herein to hold up to three times the amount of product as conventional pad dispensers. However, in other exemplary embodiments the envelope structure may have different dimensions. It will be appreciated by one of ordinary skill in the art that depending on the content of the envelope packaging the thickness of a filled envelope structure may vary. For example, an envelope structure filled with wipes may be relatively narrower in thickness than an envelope structure filled with a pad. Depending on dimensions of the envelope structure, the dimensions of the dispensing assembly, including but not limited to the dimensions of the chute, supports, and conveyor, may change in order to ensure that the filled structures can be dispensed without jamming or other difficulties.

Figure 25:
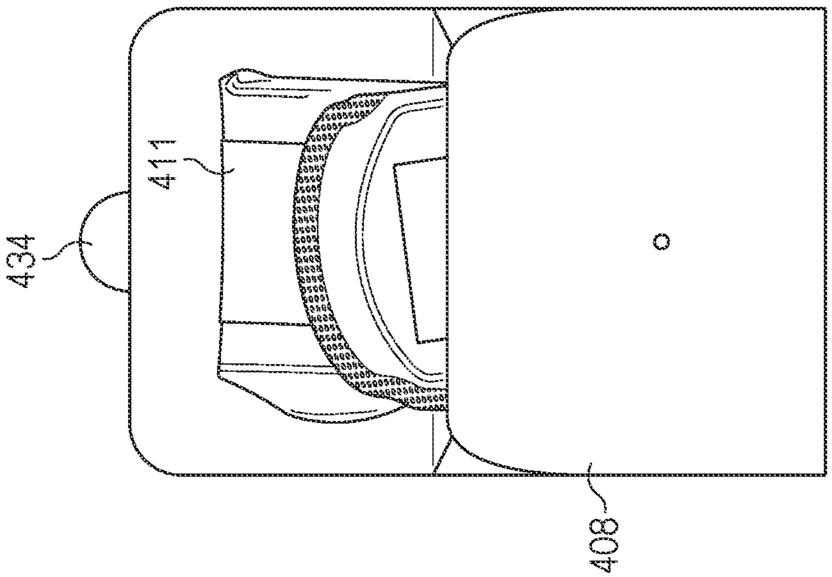
FIG. 25 is a top plan view of an exemplary item packaging containing a personal care product.

The envelope structure may be designed to be easy to access, and even reusable. Referring to FIG. 25, a sticker 434 located on the top flap 416 may be used to keep the envelope structure closed until a user needs to access the contents. A sticker 434 may also allow for the envelope structure to be reused, including for disposal purposes. In other embodiments adhesives may be used to close the envelope structure.

Figure 24:
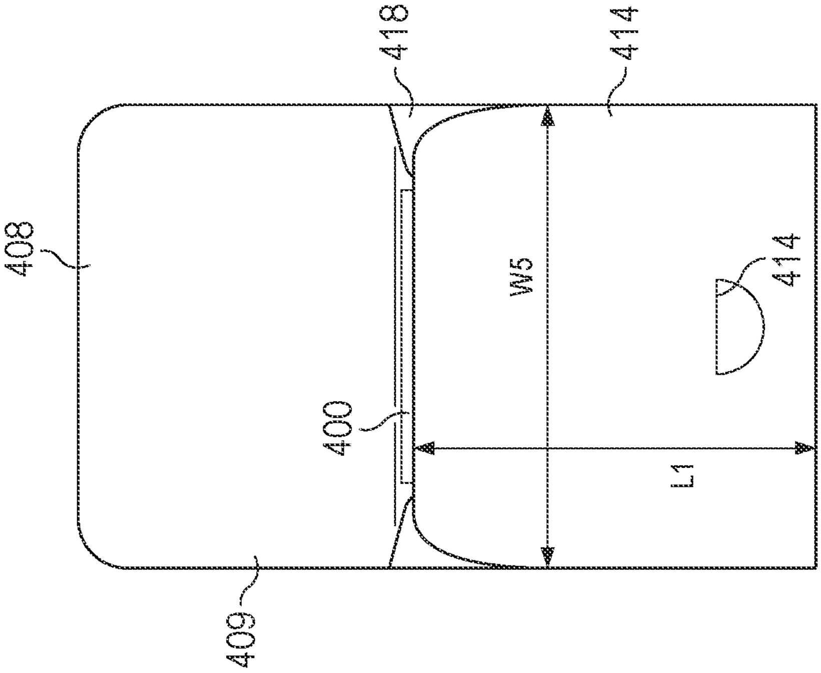
FIG. 24 is a top plan view of an exemplary item packaging containing an item.

A personal care product (e.g., pad) or PPE (e.g., a mask, wipes, or gloves) may be placed in the inner cavity the envelope structure 408 when the structure is in an open position and held in a closed position by adhesive or a sticker applied to the top flap. An envelope structure can be used as packaging for a variety of different items. Referring to FIG. 24, a folded face mask 400 is held within the envelope structure 408. FIG. 25 illustrates the envelope structure 408 containing a pad 411. The pad may be folded one or more times in order to fit within the inner cavity.

It will be appreciated by one of ordinary skill in the art that envelope packaging for holding a personal care product or an item of PPE may be formed in a variety of ways without departing from the scope of the invention.

A user may open the envelope structure and access the item by opening the top flap, or ripping the outside of the envelope structure. The user may completely remove the pad from the envelope structure, and discard the envelope structure.

In an exemplary embodiment the envelope structure is made from heavy paper or cardboard. In other embodiments the envelope structure may be made from one or more materials including paper or plastic.

Figure 26:
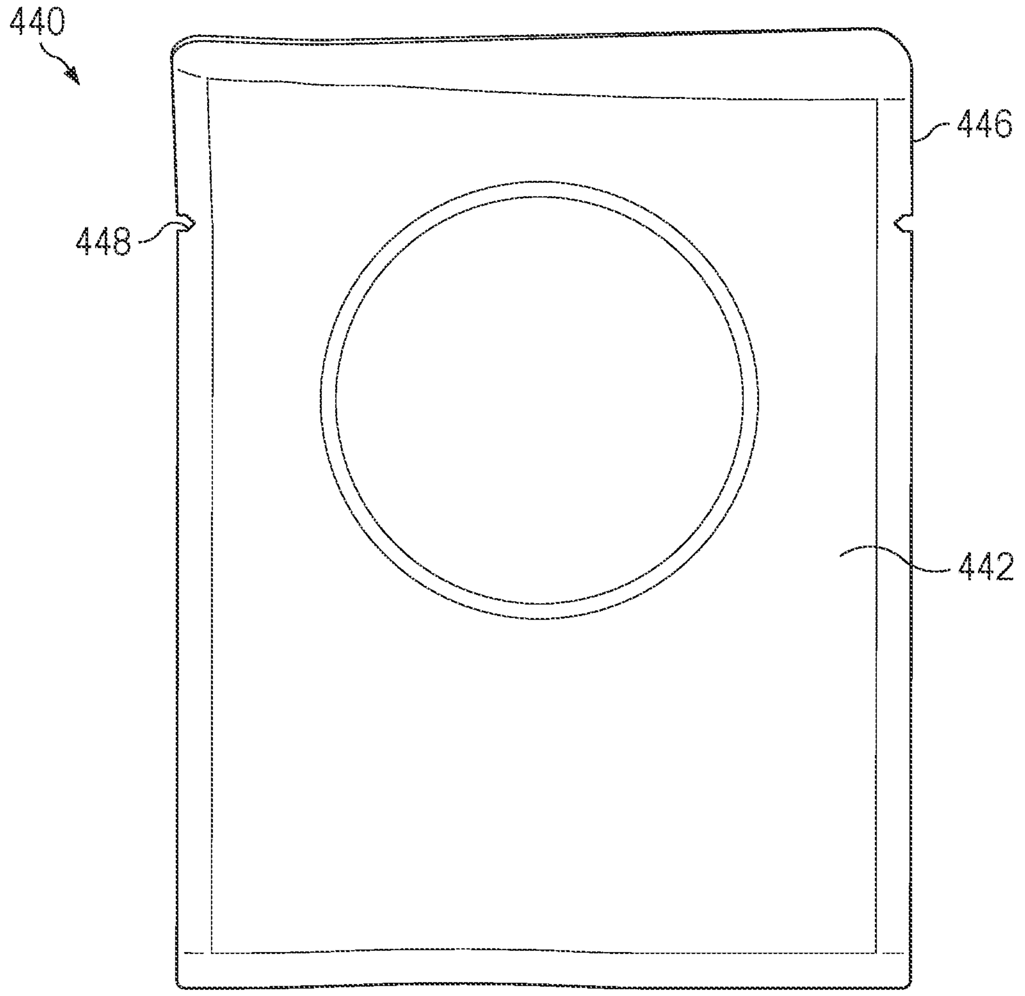
FIG. 26 is a top plan view of an exemplary embodiment of pouch packaging.

One of ordinary skill will recognize that personal care products and PPE can be packaged in a variety of ways for use with dispensing units. In an exemplary embodiment, personal care products or PPE may be packaged in pouches. Referring to FIG. 26, a pouch 440 containing an item is shown. The pouch 440 is comprised of two panels 442 sealed to one another at a perimeter seal 446. The pouch 440 may be formed of a variety of materials including but not limited to paper, plastic, foil, and mylar. A tear notch 448 disposed near the perimeter seal 446 provides a means to a user to tear at least a portion of the pouch open and access the item inside. In other exemplary embodiments a pouch may comprise different types of seals, including zipper seals, and in some embodiments may provide for multiple uses. For example, a pouch with a zipper seal may be used to dispose of a discarded pad.

Figure 27:
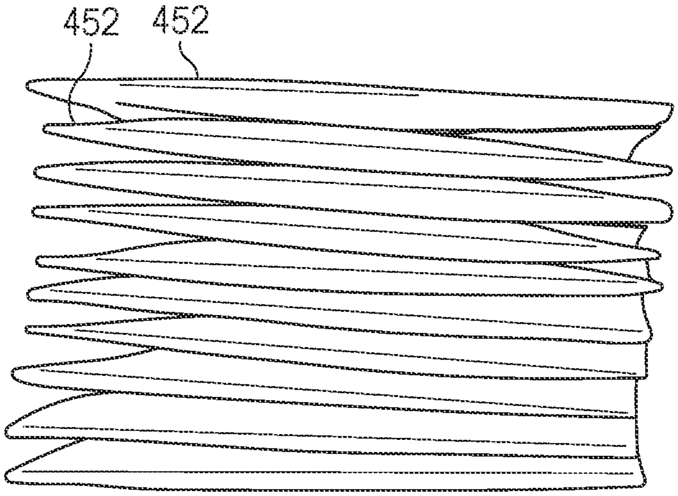
FIG. 27 is a front elevational view of a stack of packaged items.
Figure 28:
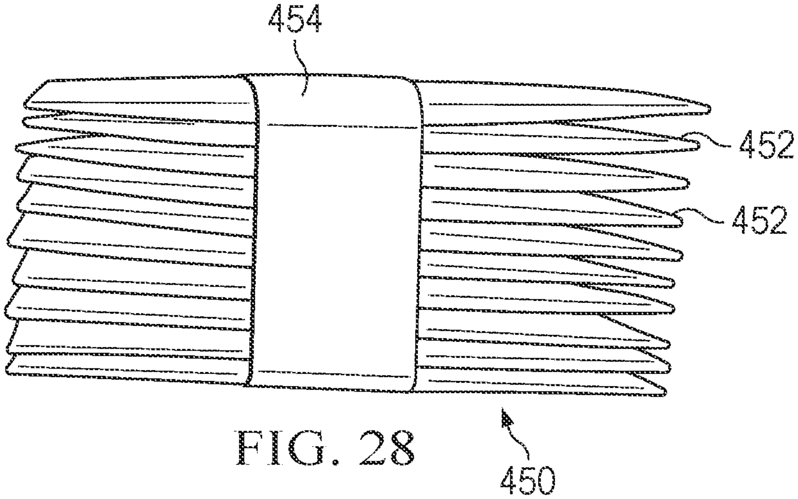
FIG. 28 is a front perspective view of a bundle of packaged items;'

In an exemplary embodiment, a plurality of packaged items may be assembled together into a bundle or other type of assembly in order to provide for more efficient filling of a dispenser assembly. Referring to FIG. 27 a stack of unbundled packaged items 452 in envelope structures are shown. The items may be personal care products or PPE. As shown in FIG. 25, the thickness of the envelope structures may be narrower at the ends of the envelope and thicker in the middle, and it is the narrower thickness on the ends that may facilitate the prongs on a conveyor to grasp the envelopes during dispensing. Referring to FIG. 28, a bundle 450 includes a plurality of packaged items 452 in envelope structures 408 and oriented in a stacked formation. In the particular embodiment there are 10 packaged items 452 in the bundle 450, but in other embodiments there may be more or less (e.g., 5, 12, 25, etc.) A strap 454 encircles the bundle 450. In an exemplary embodiment the strap 454 is of a shape, thickness, and type that allows is to securely hold the bundle together but can be easily torn away by a user. The strap 454 may be rectangular in shape and long enough to encircle the bundle 450. The strap 454 may be made of paper. A paper strap 454 may allow a user to easily tear the strap off when placing the contents of a bundle 450 into a dispenser, or otherwise needing to access one or more of the pads. A paper strap 454 may also be environmentally friendly and allow for the strap 454 to be recycled after use. In other exemplary embodiments the strap 454 may be made of a variety of materials including plastic, cardboard, ribbon, or string. One or both ends of the strap 454 may include a surface adhesive that allows the strap 454 to be fastened to itself and secure the bundle together. In different embodiments various forms of tape, glue, stickers, adhesives, and fasteners may be used to securely wrap the strap around the bundle. In other embodiments the strap may be secured by folding it on itself. An exemplary embodiment comprises an adhesive that creates a removable bond between the strap and a surface of one or more of the envelope structures 408 in the bundle 450. For example, the outer surfaces of the envelope structures 408 on the top and bottom of the stack. This may help to prevent shifting of the bundle 450 during transport or loading into the chute. In an exemplary embodiment the strap 454 may be a continuous ring formed from a material with sufficient elasticity to allow it to be stretched around a plurality of packaged pads 452 and hold the pads in proper formation.

Figure 29:
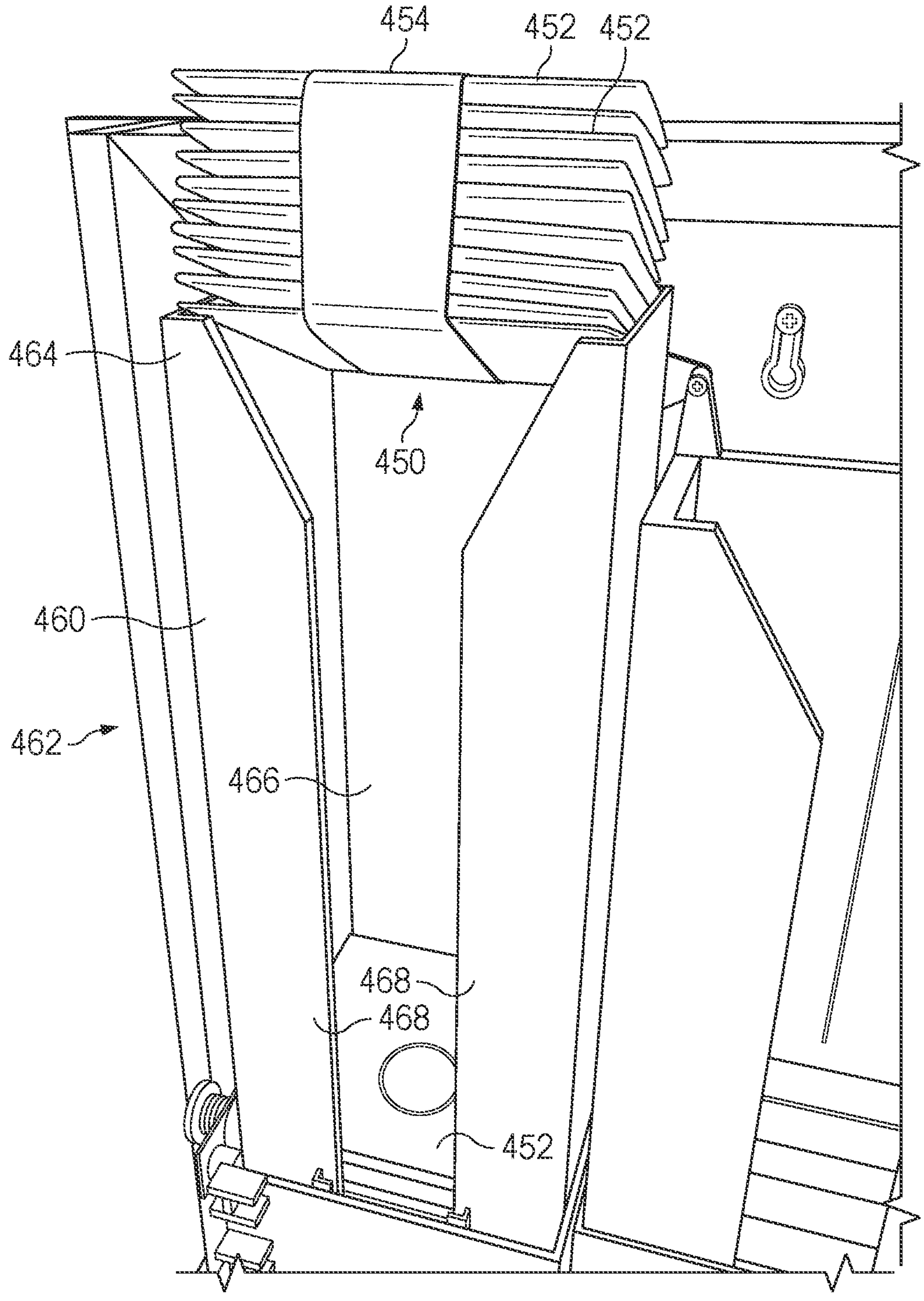
FIG. 29 is a front perspective view illustrating one step of a method of loading a bundle of packaged items into a dispensing assembly.
Figure 30:
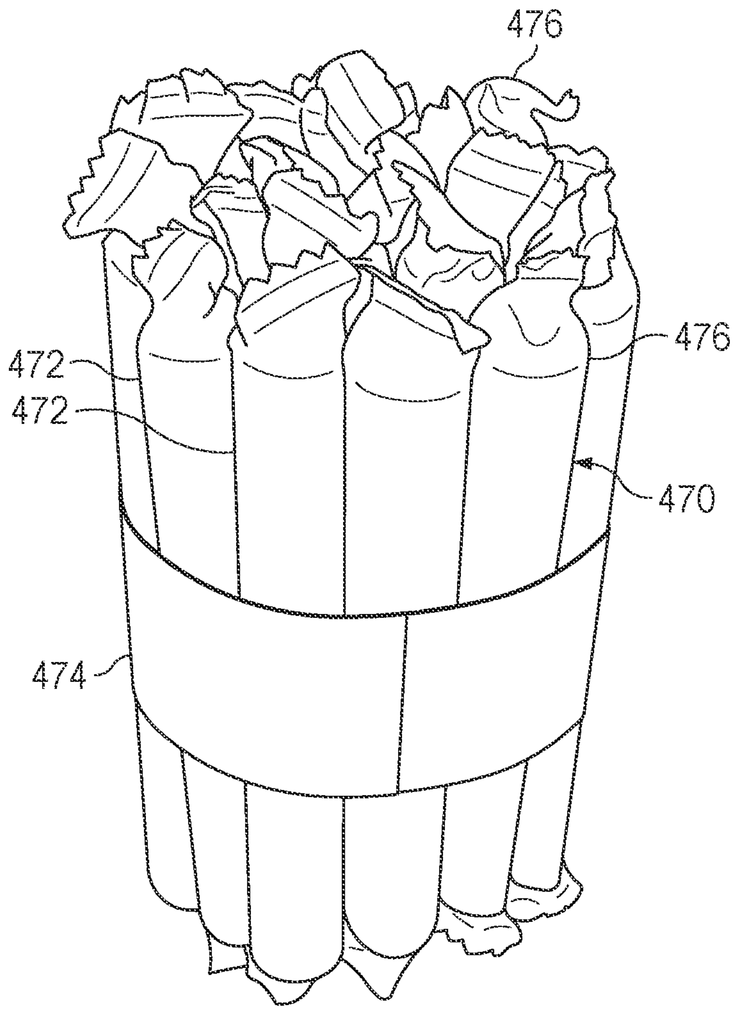
FIG. 30 is a front perspective view of a bundle of packaged personal care products.

In an exemplary embodiment, and as seen in FIG. 29, a bundle 450 may be loaded by a user into a dispensing assembly 460 of a dispensing unit 462, and more particularly, the top end of a chute 464. This would occur after the user has opened the front cover of the dispensing unit 462. The user tears the strap 454, or otherwise breaks or releases the strap 454 from the bundle 450, such that the strap 454 can be removed from the bundle 450 and pulled out of the chute 464 by the user. In an exemplary embodiment, the strap is centrally positioned on the bundle such that when a bundle is inserted into the chute 464 the strap 454 lines up with the front access region 466 located between the partial front walls 468. The strap 454 is also sized so that it can be pulled through the front access region 466 without difficulty. In an exemplary embodiment the width of the strap 454 is less than the width of the front access region 466. For example, the width of the strap 454 may be 38 mm and the width of the front access region 466 may be 76 mm.

When the strap 454 is removed the plurality of packaged items 452 are allowed to fall downward through the walls of the chute 464. A user may elect to fill a chute with a single bundle, or fill the chute with as many bundles as will fit. A user can manually manipulate any packaged items 452 that do not properly settle into a stacked formation by accessing the stack through the front access region 466.

Figure 23:
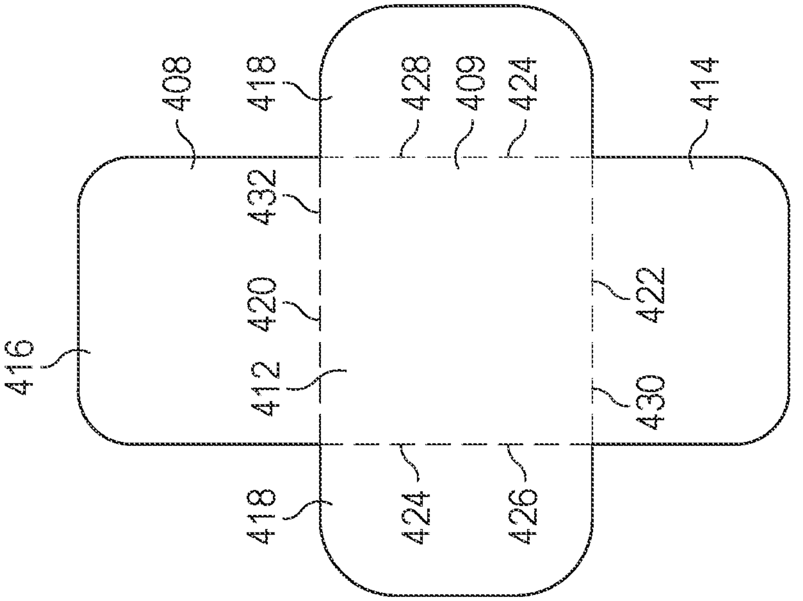
FIG. 23 is a top plan view of an exemplary item packaging in an unfolded orientation.
Figure 22:
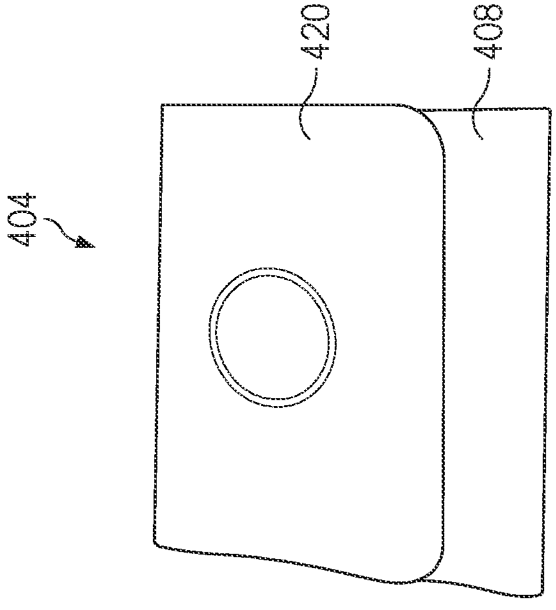
FIG. 22 is a front perspective view of an exemplary item packaging.
Figure 31:
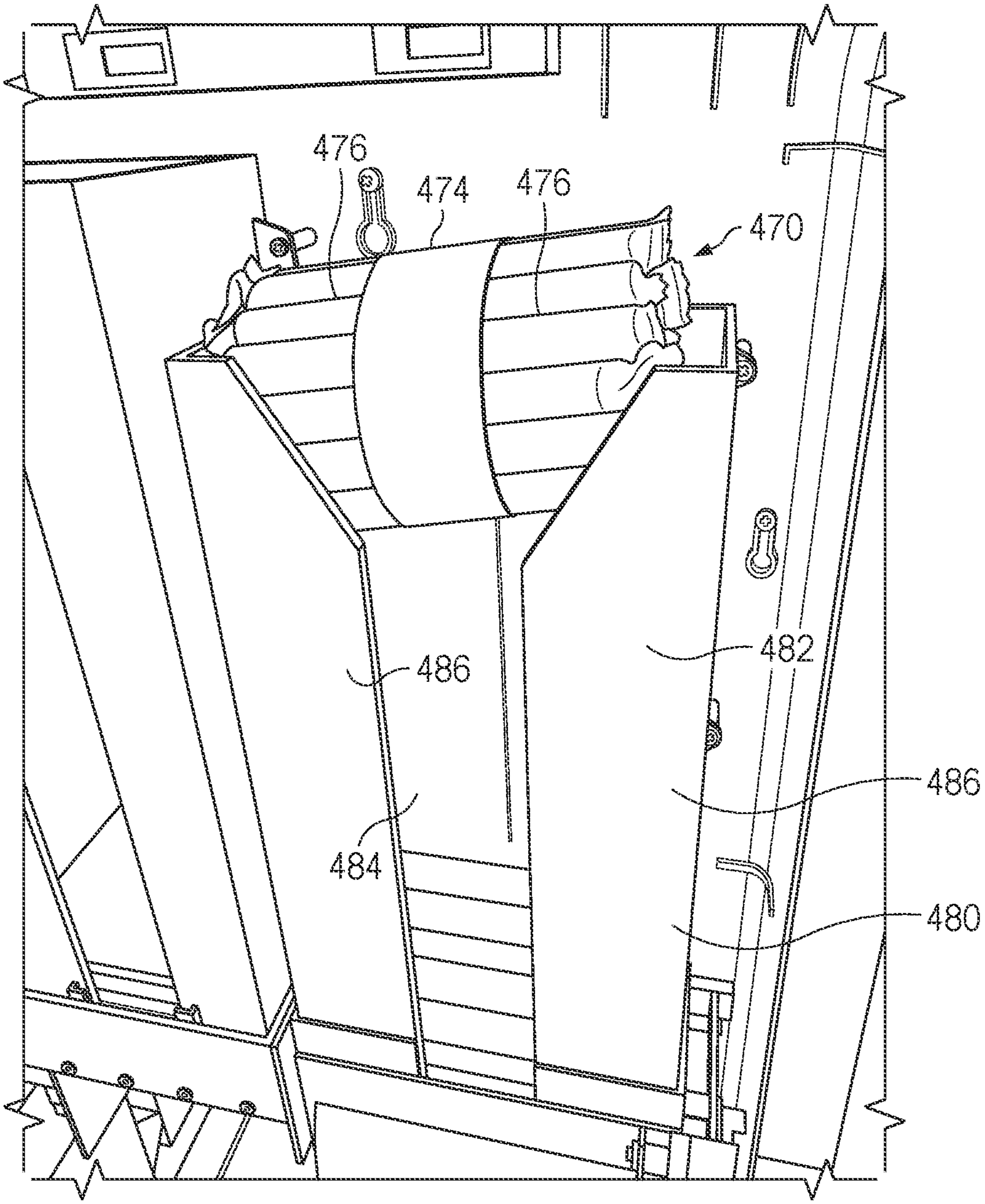
FIG. 31 is a front perspective view illustrating one step of a method of loading a bundle of personal care products into a dispensing assembly.

In an exemplary embodiment, a bundle or other assembly of tampons may be packaged together into a bundle with a removable strap to provide for more efficient filling of a dispenser assembly. Referring to FIG. 23, a bundle 470 includes a plurality of packaged tampons 472 held together by a strap 474. The tampons 472 have a cylindrical shape and are comprised of an absorbent material such as cotton or rayon. The tampons may comprise applicators made of cardboard or plastic, or may be provided without applicators. The tampons 472 are individually packaged in paper wrappers 476 but may not be packaged inside cardboard tubes or other robust packaging. In other embodiments the tampons 472 may have plastic wrappers and/or include plastic applicators. In an exemplary embodiment there are 20 tampons 472 in the bundle 470 but in other embodiments there may be more or less tampons in a bundle 470 or other assembly (e.g., 5, 10, 15, 25, etc.). The strap 474 may have the same features discussed In an exemplary embodiment, and as seen in FIG. 31, a bundle 470 may be loaded into a dispensing assembly 480 by placing it the top end of a chute 482. Once the bundle 470 is at least partially inside the chute 482 the user tears the strap 474, or otherwise breaks or releases the strap 474 from the bundle 470, such that the strap 474 can be removed from the bundle and pulled out of the chute by the user. In an exemplary embodiment, the strap is centrally positioned on the bundle such that when a bundle is inserted into the chute the strap lines up with the front access region 484 between the partial front walls 486. The strap 474 is also sized so that it can be pulled through the front access region 484 without difficulty. For example, the width of the strap 474 may be 38 mm and the width of the front access region 484 may be 76 mm.

When the strap 474 is removed the plurality of tampons 472 are allowed to fall downward into the chute 482. A user may elect to fill the chute 482 with a single bundle 470, or fill the chute 482 with as many bundles 470 as will fit. A user can manually manipulate any tampons that do not properly settle into a stacked formation by accessing them through the front access region 484.

Use of bundles of packaged personal care products or PPE makes the refilling process quicker than having to load each product into the chute individually. It is also more sanitary as there are less points of contact overall when groups of products (e.g., tampons or pads) are loaded into the chutes as bundles. If all of the products in a particular bundle do not fit a user can set aside those that do not fit and load them into the chute at a later time. In some exemplary embodiments the chute of the dispenser assembly may be sized to hold a predetermined number of bundles of a certain size. For example, a chute associated with a tampon dispensing assembly may hold 100 tampons, and bundles used with the chute may contain 20 tampons each, such that the chute can be refilled with 5 bundles after being completely emptied. In another example, chute associated with a pad dispensing assembly may hold 40 pads, and bundles used with the chute may contain 10 pads each, such that the chute can be refilled with 4 bundles after being completely emptied.

Figure 32:
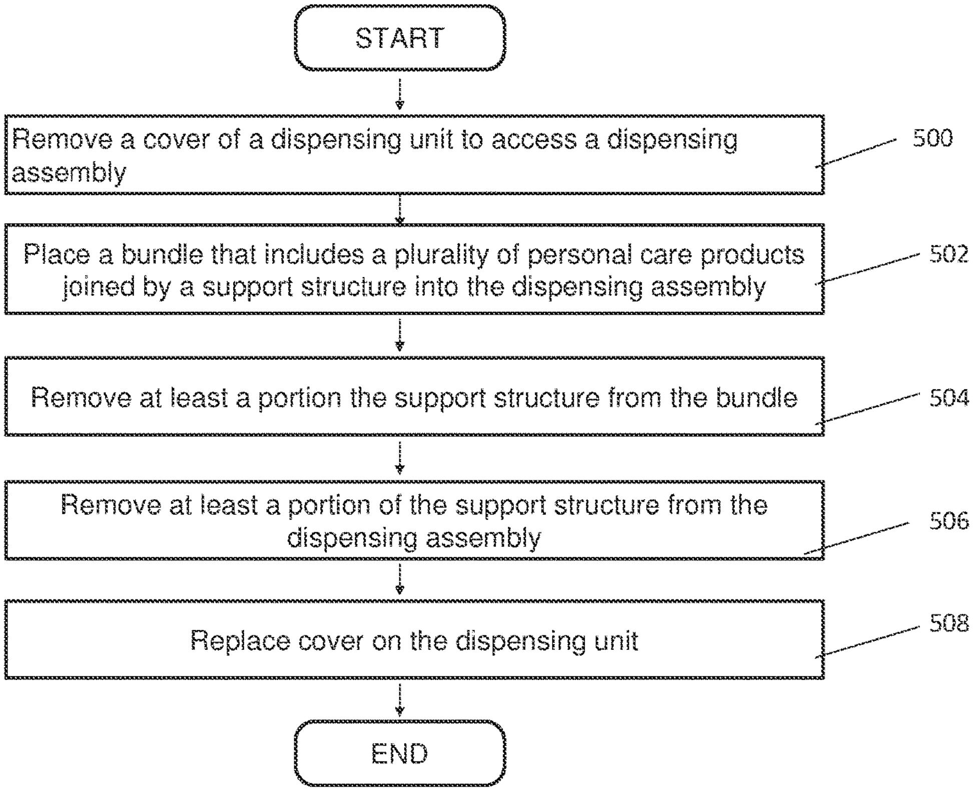
FIG. 32 illustrates a method associated with refilling a personal care product dispensing system.

A user may be anyone who has reason to access the dispensing unit and participate in the filling or refilling process. For example, they may be a custodian, building manager, or administrator. Referring to FIG. 32, an exemplary method of filling a personal care product dispensing unit is illustrated. First, the user removes the cover of the dispensing unit to access the dispensing assembly that they wish to fill or refill with personal care products 500. Next, the user places a bundle that contains a plurality of personal care products joined by a support structure into the dispensing assembly 502. The support structure may be a strap. In certain embodiments the bundle is placed into a chute associated with the dispensing assembly. The user may then remove at least a portion of the support structure from the bundle 504. This may allow the contents of the bundle to fall into the dispensing assembly. The user may then remove at least a portion of the support structure from the dispensing assembly 506 and subsequently replace the cover onto the dispensing unit 508. While in an exemplary embodiment only a portion of the support structure may need to be removed, in other embodiments the entire support structure may be removed from the bundle and from the dispensing assembly, leaving behind only the contents of the bundle.

If a user desires to place more than one bundle into a dispensing assembly then steps 502, 504 and 506 may be performed as many times as necessary to stock the dispensing assembly to the desired level. If a dispensing unit contains more than one dispensing assembly steps 502, 504, and 506 may be performed one or more times for each dispensing assembly.

It will be evident that there are additional embodiments and applications which are not disclosed in the detailed description but which clearly fall within the scope of the appended claims. The specification is, therefore, intended not to be limiting. The present invention may be embodied in other specific forms without departing from its spirit or essential characteristics. The described embodiment is to be considered in all respects only as illustrative and not restrictive. All variations that come within the meaning and range of equivalency of the claims are to be embraced within their scope.

What is claimed:

1. A product dispensing system for dispensing a product, comprising:

- a product feed chute structured to store the product, the product feed chute having a top end, an opposing bottom end, and a chute body having two sidewalls that extend a distance between the top end and the opposing bottom end and two partial front walls connected to the two sidewalls of the chute body, the two partial front walls extending from the bottom end to a middle point located between the top end and the bottom end of the product feed chute;
- a front access region positioned between the two partial front walls in the product feed chute and defining an opening that is at least partially located between the two partial front walls through which the product is loaded into the product feed chute;
- a dispensing mechanism operably connected to the product feed chute and structured to receive the product from the product feed chute; and
- an actuator structured to cause the product to be moved from the product feed chute to the dispensing mechanism.

2. The system of claim 1, wherein the chute body has a back wall that is attached between the two side walls and extends the distance between the top end and the opposing bottom end.

3. The system of claim 2, wherein the back wall, the two side walls, and the two partial front walls of the product feed chute define a rectangular shape.

4. The system of claim 1, wherein the middle point is located mid-way between the top end and the bottom end of the product feed chute.

5. The system of claim 1, wherein the middle point is located closer to the top end than the bottom end of the product feed chute.

6. The system of claim 1, wherein the middle point is located closer to the bottom end than the top end of the product feed chute.

7. The system of claim 1, wherein the opening of the front access region in the product feed chute is located between the top end and the two partial front walls.

8. The system of claim 7, wherein the opening of the front access region extends between at least a portion of the two partial front walls.

9. The system of claim 1, wherein the two partial front walls each have a top end and a bottom end, a width of the top end of the two partial front walls is narrower than a width of the bottom end of the two partial front walls.

10. The system of claim 9, wherein the width of the top end of a first of the two partial front walls is the same as the width of the top end of a second of the two partial front walls.

11. The system of claim 9, wherein an edge of the respective two partial front walls is angled between the width of the top end and the width of the bottom end of the two partial front walls.

12. The system of claim 10, wherein the width of the bottom end of the first of the two partial front walls is the same as the width of the bottom end of the second of the two partial front walls.

13. The system of claim 1, wherein the opening of the front access region is located entirely between the two partial front walls.

14. The system of claim 1, wherein the front access region has a top portion and a bottom portion, the top portion is partially located above the middle point of the product feed chute, and the bottom portion is located between the two partial front walls of the product feed chute.

15. The system of claim 14, wherein the top portion is an opening between side walls of the chute body.

16. The system of claim 1, wherein the product feed chute has an interior portion in which the product is structured to be stored, and a bottom end of the product feed chute is structured to guide the product from the interior portion towards the dispensing mechanism.

17. The system of claim 16, wherein the bottom end of the product feed chute includes an angled portion in the interior portion of the product feed chute.

18. The system of claim 16, wherein the bottom end of the product feed chute includes first angled portion and a second angled portion, both the first angled portion and the second angled portion structured to guide the product towards the dispensing mechanism.

19. The system of claim 18, wherein the first angled portion and the second angled portion are located on opposing interior side walls of the interior portion of the product feed chute.

20. The system of claim 18, wherein the first angled portion and the second angled portion are located at the same height along a height of the interior portion of the product feed chute.

21. The system of claim 18, wherein the the first angled portion and the second angled portion are located at different heights along a height of the interior portion of the product feed chute.

22. The system of claim 1, wherein the product feed chute has an interior portion in which multiples of the product are structured to be stored, and has a height and a depth capable of storing multiple products along the height and multiple products across the depth.

23. The system of claim 1, wherein the product feed chute has an interior portion in which multiples of the product are structured to be stored, and has a height and a depth capable of storing a single stack of products along the height and a single product across the depth.

24. The system of claim 1, further comprising a housing in which the product feed chute, the front access region, and the dispensing mechanism are located, the housing having a window through which at least a portion of the front access region is viewable.

25. The system of claim 1, wherein the actuator is electronic.

26. The system of claim 1, wherein the actuator includes a motion sensor.

27. The system of claim 1, wherein the product dispensing system is free vend.

28. The system of claim 1, wherein the product includes one or more of a personal care product, a packaged tampon, an unpackaged tampon, a pad, and a personal protective equipment.

* * * * *